United States Patent [19]

Kume et al.

[11] Patent Number: 5,109,379
[45] Date of Patent: Apr. 28, 1992

[54] STORAGE STAR NETWORK

[75] Inventors: Hiroshi Kume; Atsushi Fujimoto; Naotaka Maruyama, all of Tokyo, Japan

[73] Assignee: Fuji Xerox Co., Ltd., Tokyo, Japan

[21] Appl. No.: 576,262

[22] Filed: Aug. 24, 1990

Related U.S. Application Data

[63] Continuation of Ser. No. 342,683, Apr. 25, 1989, abandoned, which is a continuation of Ser. No. 120,540, Nov. 13, 1987, abandoned.

[30] Foreign Application Priority Data

Nov. 14, 1986 [JP] Japan .................. 61-269713
Nov. 14, 1986 [JP] Japan .................. 61-269714
Nov. 14, 1986 [JP] Japan .............. 61-269715g280101

[51] Int. Cl.$^5$ ............................ H04J 3/24
[52] U.S. Cl. .................... 370/94.3; 370/94.1; 370/85.6
[58] Field of Search ............ 370/94.3, 63, 85

[56] References Cited

U.S. PATENT DOCUMENTS

| | | | |
|---|---|---|---|
| 3,889,064 | 6/1975 | Fletcher | 370/94.3 |
| 4,334,306 | 6/1982 | Ulug | 370/94.3 |
| 4,450,554 | 5/1984 | Steensma et al. | 370/94.3 |
| 4,577,311 | 3/1986 | Duquesne et al. | 370/84 |
| 4,679,190 | 7/1987 | Dias et al. | 370/60 |
| 4,698,841 | 10/1987 | Haselton et al. | 370/94.3 |
| 4,745,599 | 5/1988 | Raychaudhuri | 370/94 |
| 4,866,668 | 9/1989 | Edmonds et al. | 370/94.3 |

FOREIGN PATENT DOCUMENTS 0201252 4/1986 United Kingdom.
2187067A 9/1987 United Kingdom.

Primary Examiner—Douglas W. Olms
Assistant Examiner—T. Samuel
Attorney, Agent, or Firm—Finnegan, Henderson, Farabow, Garrett, and Dunner

[57] ABSTRACT

A storage star network for providing maximum propagation delay includes a plurality of terminal stations and a toll center for routing data packets among the stations. Each terminal station includes a memory and each data packet has an associated priority.

12 Claims, 19 Drawing Sheets

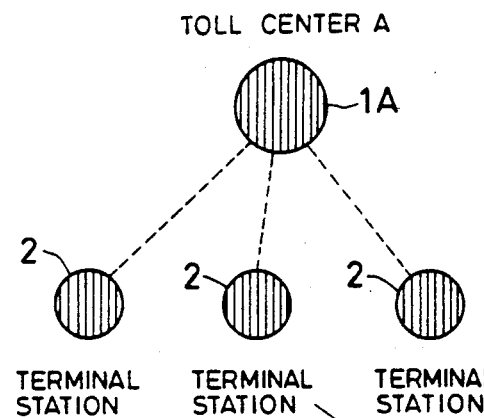
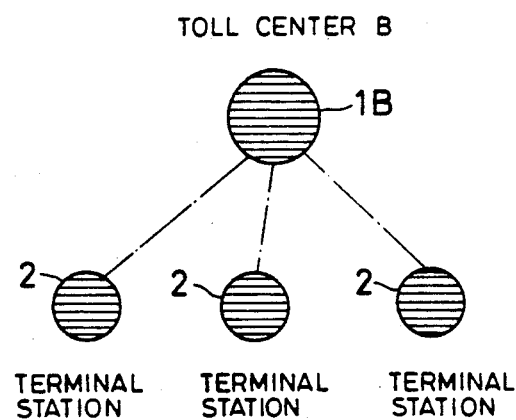
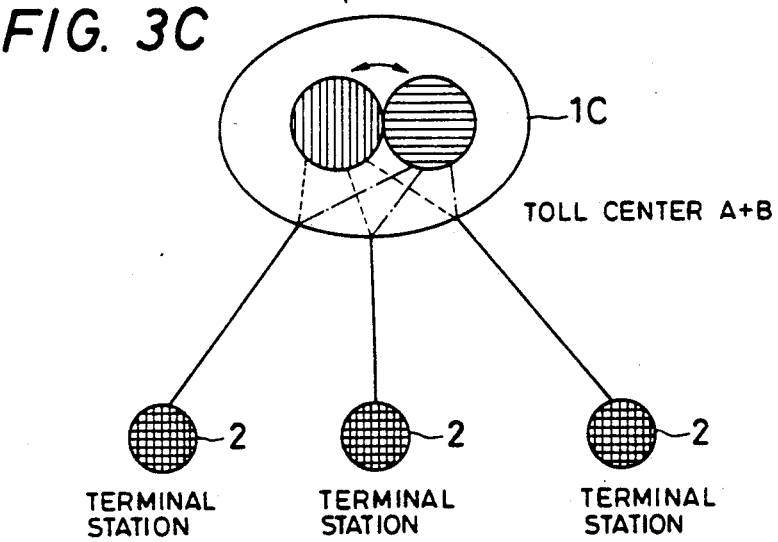
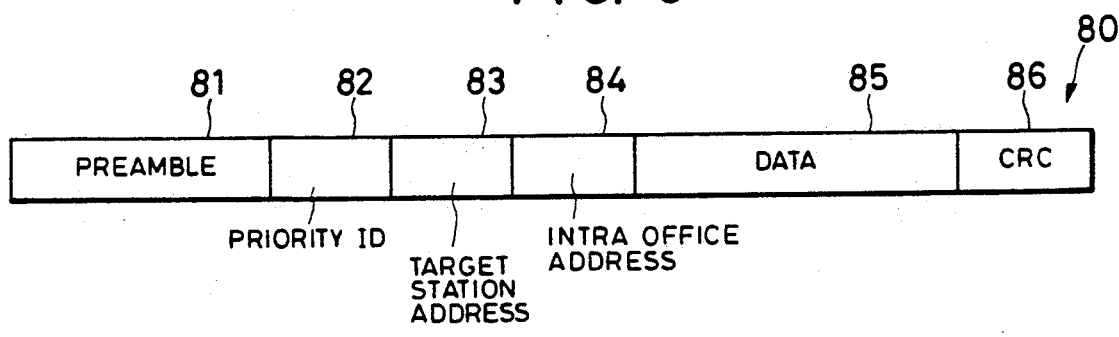

STORAGE STAR NETWORK

This application is a continuation of application Ser. No. 342,683, filed Apr. 25, 1989, which is a continuation of Ser. No. 120,540, filed Nov. 13, 1987, both now abandoned.

BACKGROUND OF THE INVENTION

The present invention relates to a storage star network in which a maximum propagation delay is assured.

As shown in FIG. 1 the conventional star network is made up of a toll center 1 and a plurality of terminal stations 2A to 2M connected to the toll center 1 through transmission lines 20A to 20M and reception lines 21A to 21M, respectively (Japanese Patent Publication No. 16453/1984).

In the prior art network of FIG. 1 a data packet is transmitted from a terminal station 2A to the toll center 1 through a transmission line 20A. Upon reception of the data packet, the toll center 1 broadcasts the data packet for all the terminal stations 2A to 2M through reception lines 21A to 21M. Each of the terminal stations 2A to 2M judges whether the data packet is addressed to it and receives the data packet if so.

Each of the terminal stations 2A to 2M monitors the the reception lines 21A to 21M, respectively. When a data packet is detected on the reception line the terminal station will not transmit a data packet to the toll center. If a terminal station receives a transmission request, it will begin data packet transmission to toll center 1 after waiting until the data packet in the reception line has been completely transmitted.

However, in the prior art network shown in FIG. 1, if a transmission request is given to a plurality of terminal stations, data packets will collide with each other because the data packets are simultaneously transmitted. The toll center is provided with a device to detect such a collision when two terminal stations or more send out signals at the same time, and informs all the terminal stations of the collision. Upon notification of a collision from the toll center, each of the terminal stations currently transmitting stops sending the data packet and executes a re-transmission algorithm for transmitting the data packet again. This circumstance will be explained with reference to FIG. 1.

First, the station A of the terminal stations sends out a data packet to the toll center through station-A's transmission line 20A. The data packet is illustrated as "station-A transmitted packet" in FIG. 2. Upon reception of this data packet, the toll center broadcasts the data packet to the stations A, B and C. In this example, the respective lengths of the reception lines for the stations A, B and C increase in order and therefore the transmittal of a data packet to the station C from the toll center is delayed most because of differences in propagation time. In FIG. 2, the reception of the data packet by the stations A, B and C are illustrated as "station-A received packet", "station-B received packet" and "station-C received packet", respectively.

Next, assume that station B sends out a data packet and station C begins to send out a data packet before the transmission by station B has been completed. At that time, the packet collision is detected in the toll center at the hatched portion in the drawing. Then the toll center notifies the network that a collision has occurred by either sending out the overlapped signal produced by the collision or sending a collision notification signal. Which ever course of action is taken by the toll center, stations B and C will receive notification of the collision. Immediately upon receiving notification of the collision stations B and C will begin retransmission of their respective data packets. The re-transmitted data packet from station B will reach the toll center before station C's data packet because it takes less time for the signals to travel the shorter distance from the toll center to station B.

If station A, which is even closer to the toll center, subsequently transmits a data packet, a collision between the data packet re-transmitted by station C may occur as illustrated in FIG. 2. The process of notification and retransmission would be repeated and the data packet from station C would be further delayed. This sequence illustrates how this star network can cause considerable delays in transmission of data packets.

Conventionally, in the prior art, data packet collision has been treated in the manner described above.

In the case where the transmission request is given to a plurality of terminal stations, data packets collide with each other because they are simultaneously transmitted. To make it possible that the toll center 1 receives all the data packets without losing the respective data packets upon occurrence of such collision, the inventors have developed a storage star network in which reception memories are provided in the toll center 1 for the purpose of temporarily storing data packets sent from the respective terminal stations, thus to make it possible that the data packets are successively read (polled) as shown in unexamined Japanese Patent Application No. 226570/1986. According to the network, contact time delay occurs between the time of data packet transmission from a terminal station and the time of data packet reception by another terminal station after broadcasting of the data packet from the toll center. The delay is called "propagation delay".

In the storage star network guaranteed to have a maximum propagation delay, the quantity of data packets simultaneously stored in the toll center is limited to guarantee that the maximum propagation delay of the packets sent from the terminal stations is within a predetermined time. Accordingly, if packets from the respective terminal stations are concentrated into the toll center at once, the time required for broadcasting the data packets from all the reception memories of the toll center is within a predetermined time. In other words, data packets sent from the respective stations to the toll center can be broadcast within a predetermined time. The maximum propagation delay of the system depends on the predetermined time.

All the terminal stations in the aforementioned system, however, are not guaranteed to have a maximum propagation delay. Assuming that the maximum propagation delay is 10 msec and that the transmission rate of audio signal is 64 kbps (64 kbit per second), the terminal station dealing with an audio signal must send the packet of about 80 bytes per 10 msec, more particularly, about 100 bytes per 10 msec inclusive of the overhead of the packet. Accordingly, the reception memory in the terminal interface of the toll center must provide at least 100 bytes for the terminal station having one audio channel. On the other hand, for example in the Easanet system (data communication network by Xerox Corp.), the maximum packet length is established to be 1500 bytes. Generally, in such communication between computers, the packet length is required to be so much.

Consequently, the reception memory in the terminal interface of the toll center must provide about 1500 bytes for the datagram terminal station sending the aforementioned packet.

The problems in such a conventional star network as shown in FIGS. 1 and 2 are as follows.

(1) As the circuit becomes crowded, the probability that signals collide with each other increases and thereby causes variations in delay time. Large variations in delay time make the network unsuitable for real time transmissions such as voice communication which stress the real-time relationship between transmission and reception.

(2) Invalidation of signals due to collisions wastes network resources. This waste causes the guaranteed transmission capacity to be far less than the actual physical transmission capacity.

(3) In the case where the system length is so much, a time lag between the time required for transmitting a data packet from a short-distance terminal station to the toll center and the time required for transmitting a data packet from a far-distance terminal station to the toll center becomes large. It is therefore apprehended that packet collision cannot be detected in the toll center. Accordingly, the maximum system length must be limited so that packet collision can be detected.

In a storage star network system guaranteed to have a maximum propagation delay, there is a solution for avoiding data packet collision. That is, assuming that the transmission rate is 10 Mbps in the storage star network system guaranteed to have a maximum propagation delay, 128 audio terminal stations which can be connected to the toll center but no more than 8 Easanet datagram terminal stations. This is because datagram terminal stations and audio terminal stations are all guaranteed to have the same maximum propagation delay. The characteristics of such datagram terminal stations are as follows:

(1) Data transmission can be made without the establishment of connection;

(2) The duty factor is too small;

(3) The probability that minimum length packets and maximum length packets will be sent out is high; and (4) It is unnecessary to have a guaranteed maximum propagation delay, i.e., guaranteeing a maximum propagation delay for both.

Accordingly, it is not always necessary that datagram terminal stations are treated in the same way as audio terminal stations are treated.

SUMMARY OF THE INVENTION

A principal object of the present invention, based on the aforementioned characteristics of datagram terminal stations, is to provide a storage star network in which reception memories for terminal stations not guaranteed to have a maximum propagation delay are treated separately from other reception memories for terminal stations warranted in maximum propagation delay.

Another object of the invention is to provide a storage star network in which sync data packets and async data packets sent from respective terminal stations are separately processed to thereby improve the efficiency of the packet switching network.

Further, an object of the invention is to provide a storage star network with a guaranteed propagation delay time to thereby utilize communication lines efficiently.

The storage star network according to the present invention comprises a plurality of terminal stations, and a toll center for receiving data packets sent from the respective terminal stations, the toll center being arranged such that a plurality of reception memories are prepared for every terminal station in order to store temporarily the data packets sent from the terminal stations, priority is established on the reception memories so that the data packets are stored in the reception memories in accordance with the priority, and the data packets stored in the reception memories are read out in accordance with the priority so as to be broadcast to the terminal stations.

Further, a storage star network according to another system of the present invention comprises a plurality of terminal stations, and a toll center for receiving data packets sent from the respective terminal stations, the toll center being arranged such that a first and a second reception memory are prepared for every terminal station in order to store temporarily the data packets sent from the respective terminal stations, sync and async data packets are stored in the first and second reception memories respectively, and a predetermined time frame is established so that after the data packets stored in the first reception memory are read, the data packets stored in the second reception memory are read as long as vacant time remains within the time frame and the data packets are broadcast for the respective terminal stations.

In the storage star network according to another system of the invention, data packets sent from terminal stations are segregated so that sync data packets are stored in the first reception memories and async data packets are stored in the second reception memories. The sync data packets are read out in a predetermined order and simultaneously broadcast. This procedure is repeated within a predetermined time frame with securing communications warranted in maximum propagation delay. On the other hand, using vacant time in the time frame, the async data packets are read and simultaneously broadcast. Thus, the communications network can be efficiently used with preventing data packets from colliding with each other.

Furthermore, storage star network comprising a plurality of terminal stations, and a toll center connected to said terminal stations through two-way communication lines, according to another system of the present invention, is characterized in that each of the terminal stations is arranged so that the terminal station produces a frame composed of a frame header and a plurality of slots, and transmits the frame to the toll center with predetermined information put in one of the slots to be used by intra-office and predetermined dummy data put into at least one of the slots disposed between the frame header and the intra-office used slot, and in that the toll center is arranged so that the toll center produces a multi-addressing frame by ORing the respective frames sent from the terminal stations and simultaneously multi-addresses the multi-addressing frame to all of the terminal stations.

In the storage star network according to the system of the present invention, each of the terminal stations previously recognizes a specific one of the slots to be used by intra-office in the frame and transmits the frame to the toll center with information to be transmitted put in the specific slot. The frame is composed of a frame header followed by a plurality of slots, and with respect to the frames simultaneously sent out from the terminal stations to the toll center, two or more of the terminal stations never use the same slots.

Accordingly, if each of the terminal stations inserts dummy data between the frame header and the intra-office used slot and, for example, if the toll center suitably adds dummy data after the slot and makes a logical sum among the frames sent from the respective terminal stations, the toll center can obtain a multi-addressing frame in which a frame header is followed by a series of the slots sent by the respective terminal stations. If the thus obtained multi-addressing frame is simultaneously multi-addressed from the toll center to the terminal stations, it is possible to realize so-called real time transmission because little time is required for signal processing in the toll center. Further, signal collision or the like never occurs.

To achieve the objects and in accordance with the purpose of the invention, as embodied and broadly described herein, the storage star network of this invention comprises a plurality of terminal stations for transmitting a plurality of data packets each of the data packets having a priority level relative to the other plurality of data packets; a toll center for receiving the plurality of data packets transmitted by the plurality of terminal stations and for transmitting the plurality of data packets to the plurality of terminal stations, the toll center including a plurality of reception memories associated with each of said plurality of terminal stations effective when actuated for temporarily storing the data packets transmitted by respective terminal stations each the reception memory having an assigned level corresponding to the priority levels of a respective data packet means associated with each of the terminal stations responsive to each of the plurality of data packets transmitted by the plurality of terminal stations for detecting the priority level of each respective data packet transmitted by the plurality of terminal stations and means associated with each of the plurality of terminal stations responsive to the means for selectively activating the plurality of reception memories.

In another aspect and as embodied and broadly described herein, a storage star network in accordance with the invention comprises a plurality of terminal stations for transmitting synchronous and asynchronous data packets, a toll center for receiving the data packets transmitted by the plurality of terminal stations and for transmitting data packets to the plurality of terminal stations, including a plurality of reception memories for temporarily storing data packets received from the plurality of terminal stations wherein the plurality of reception memories include a plurality of synchronous data reception memories having at least one associated with each of the plurality of terminal stations for storing synchronous data packets and a plurality of asynchronous data reception memories having at least one associated with each of the plurality of terminal stations for storing asynchronous data packets, means associated with each of said plurality of terminal stations responsive to said data packets transmitted by said plurality of terminal stations for seperating the syncyhronous and asynchronous data packets transmitted by the plurality of terminal stations and storing said data packets in said synchronous and asynchronous memories, respectively, means for designating a given time frame, means for transmitting the synchronous data packets at the start of the given time frame and indicating that all synchronous data packets available for transmission have been transmitted and means for transmitting the asynchronous data in response to the means for indicating and the means for designating a time frame wherein the asynchronous data packets are transmitted before the beginning of the next time frame.

In still another aspect and as embodied in broadly described herein, a storage star network in accordance with the invention comprises a plurality of terminal stations for transmitting data within time frames having means for producing a data sequence during said frame of data having a header and a plurality of slots and a toll center connected to the terminal stations for receiving the transmitted data and transmitting to the plurality of terminal stations, including means for producing a multi-addressing frame by combining the data frames from the terminal stations; and means for multi-addressing the frame for transmission to the terminal stations.

The accompanying drawings, which are incorporated in and constitute a part of this specification, illustrate one embodiment of the invention and, together with the description, serve to esplain the principles of the invention.

BRIEF DESCRIPTION OF THE DRAWINGS

FIGS. 3A, 3B and 3C are views for explaining the basic concept of the storage star network in accordance with the first embodiment of the present invention;

FIG. 5 is a view for explaining the structure of the data packet sent from the terminal station;

DETAILED DESCRIPTION OF THE INVENTION

Figure 1:
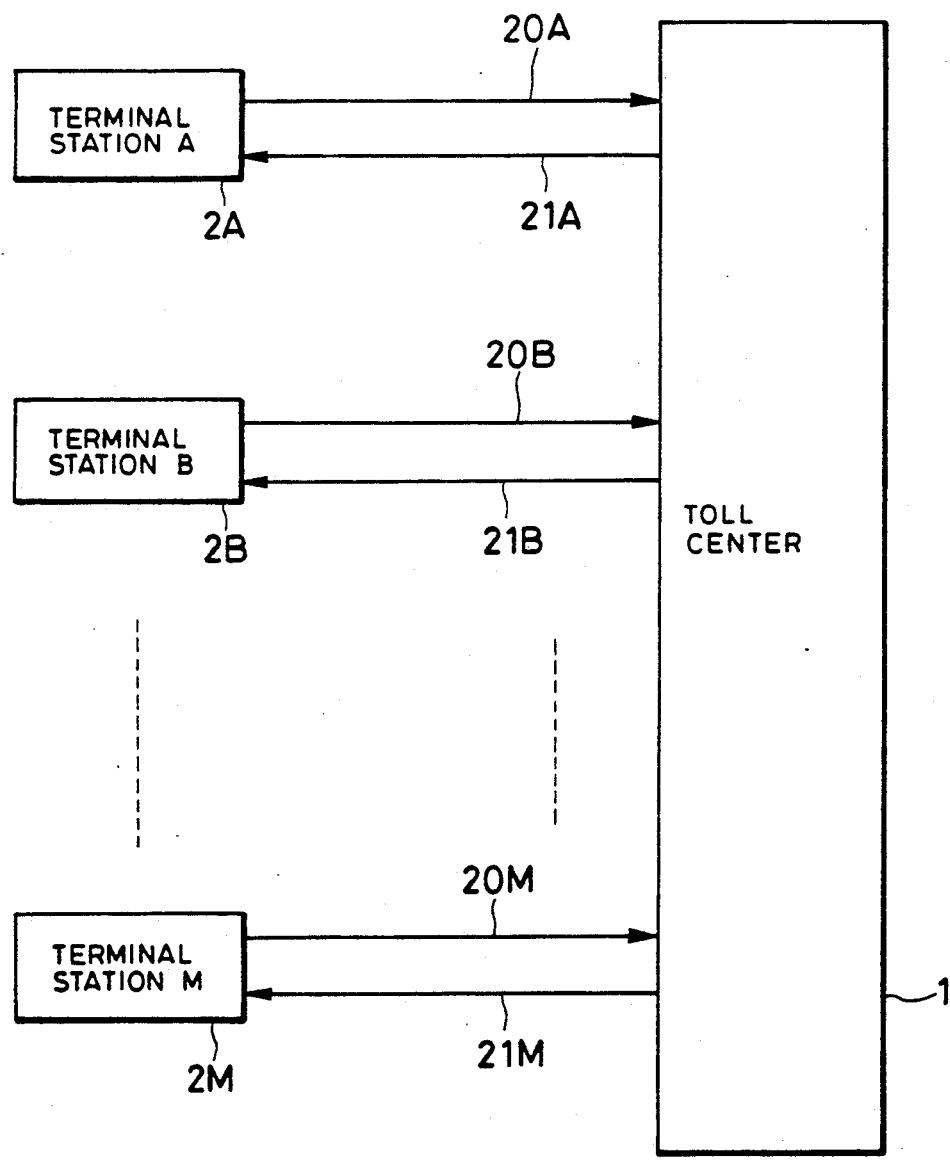
FIG. 1 is a block diagram of a conventional star network.

FIGS. 3A to 3C illustrate the basic concepts of a first embodiment of the invention. FIG. 3A shows a storage star network with a guaranteed maximum propagation delay, in which terminal stations 2 connected to a toll center 1A are limited in number but data packets have a guaranteed maximum propagation delay in compensation.

On the other hand, FIG. 3B shows a storage star network not guaranteed to have a maximum propagation delay, in which terminal stations 2 connected to a toll center 1B are not limited in number.

The basic concept of the storage star network of the invention is as follows.

In accordance with the invention the toll center includes a plurality of reception memories for temporarily storing said data packets sent from said plurality of terminal stations wherein a given number of said plurality of reception memories are associated with each terminal station. As embodied herein, a plurality of reception memories are prepared for every terminal in order to form one system encompassing two toll centers 1A and 1B as shown in the drawing. Toll center 1C gives priority to those data packets requiring a guaranteed maximum propagation delay by polling the reception memories as would be the case with a pure storage star network with limited numbers of terminal stations 2. On the other hand, the prioritization of the reception memories allows data to be processed which does not have a guaranteed maximum propagation delay by assigning a lower priority to this data and in this way toll center 1C has the same capabilities as toll centers 1A and B without their limitations.

More particularly, if data packets exist in the reception memories guaranteed to have a maximum propagation delay, the data packets are read out of these reception memories first. After all of the data packets have been read out from the reception memories guaranteed to have a maximum propagation delay, polling of the other reception memories not guaranteed to have a maximum propagation delay is started. If data packets are put into the reception memories guaranteed to have a maximum propagation delay during the polling of the other reception memories without a guaranteed maximum propagation delay, polling of the reception memories guaranteed to have a maximum propagation delay is immediately restarted. Thus, data packets guaranteed to have a maximum propagation delay and data packets not guaranteed to have a maximum propagation delay can coexist.

The idea that data packets can be divided into two types based on whether a maximum propagation delay is guaranteed or not, is equivalent to having data packets with two levels of priority. That is, the data packets with a guaranteed maximum propagation delay are given a higher priority than those data packets which have no guarantee as to the propagation delay. This priority scheme can be expanded to include several levels of priority.

Block Construction

In accordance with the invention, the storage star network comprises a plurality of terminal stations for transmitting data packets and a toll center for receiving said data packets sent from said plurality of terminal stations and for transmitting data packets to said plurality of terminal stations.

As embodied herein, transmission lines 20A, 20B of terminal stations 2 (FIGS. 3A to 3C) are connected to corresponding channel units (CH units) 3A, 3B which are connected to a transmitter 7 through a data bus 40. Transmitter 7 is connected to all terminal stations 2 (FIGS. 3A to 3C) through reception lines 21. The CH units 3A, 3B are connected to a control circuit 5 and read signal sending circuits 6-1 to 6-N through control busses 4-1 to 4-N, respectively. Both the CH units 3A and 3B have separation circuits 31A and 31B, respectively, and n reception memories 32-1 to 32-N, respectively.

In accordance with the invention, the toll center includes means associated with each of said terminal stations responsive to each of said data packets transmitted by said plurality of terminal stations for detecting one of a given number of priority levels for each of said data packets transmitted by said plurality of terminal stations wherein said given number of priority levels corresponds to the number of reception memories associated with each terminal station; and means associated with each of said plurality of terminal stations responsive to said means for detecting priority levels for storing said data packets transmitted by said terminal stations in said plurality of reception memories.

As embodied herein, data packets transmitted from the stations A and B to the toll center 1 through the transmission lines 20A and 20B are divided into classes (according to the priority) by the separation circuit 31A and 31B, respectively, and then stored in the reception memories 32-1 to 32-N corresponding to the respective levels. It is now assumed that the data packet of the highest priority is stored in the level-1 reception memory 32-1 and the data packet of the lowest priority is stored in the level-n reception memory 32-N. When the reception memories 32-1 to 32-N have data packets stored therein, empty signals 5-1 to 5-N, respectively, are turned off. When the reception memories have no data packet stored therein, empty signals 5-1 to 5-5 from the respective memories are turned on.

Empty signals 5-1 to 5-N are fed to control circuit 5 and read signal sending circuits 6-1 to 6-N through the control busses 4-1 to 4-N, respectively. Control circuit 5 monitors the empty signals of the reception memories 32-1 to 32-N and detects those having the highest priority among the reception memories having the empty signals turned off. Control circuit 5 is operatively coupled to read signal sending circuits 6-1 to 6-N via enable signal lines. Once control circuit 5 has determined the highest priority level of empty signal which is turned off, the read signal sending circuit corresponding to that priority level is activated by control circuit 5.

The read signal sending circuits 6-1 to 6-N poll the empty signals of the respective reception memories, and send read signals through the control busses 4-1 to 4-N to the memories having the empty signals turned off. The data packets read from the reception memories 32-1 to 32-N according to the read signals are transmitted to all the terminal stations by the transmitter 7.

Packet Format

Referring to FIG. 5, the data packet 80 of the first preferred embodiment is made up of a preamble 81, a priority ID 82, a target station address 83, an intra office address 84, a data 85, and a cyclic redundancy code (CRC) 86. The preamble 81 includes a start delimiter, a sync pattern and so on. The priority ID 82 includes a code which expresses the priority of the packet. CRC 86 includes a frame check code.

CH Unit

Figure 6:
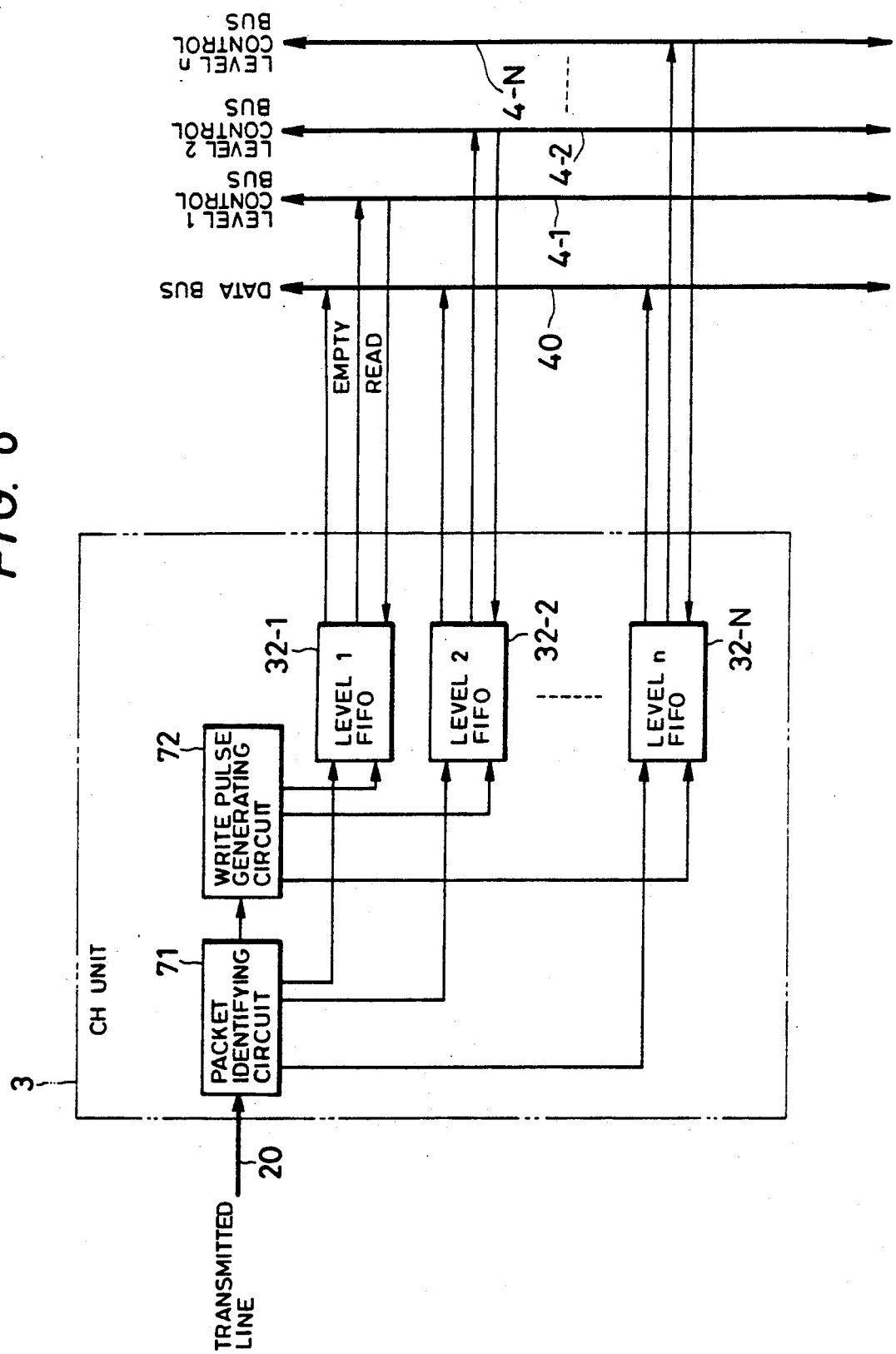
FIG. 6 is a detailed block diagram of the CH unit depicted in FIG. 4.

CH unit 3 shown in FIG. 6 is a circuit for sorting the data packets 80, received through the respective transmission line 20, according to the priority, and for writing the data packet into one of the corresponding reception memories 32-1 to 32-N.

This circuit is made up of a packet identifying circuit 71, a write pulse generating circuit 72 and n reception memories 32-1 to 32-N corresponding to level-1 to level-n, respectively. The packet identifying circuit 71 is a circuit for reading the priority ID 82 from the data packet 80 and for feeding a signal corresponding to the priority level determined from priority ID 82 to the write pulse generating circuit 72. The write pulse generating circuit 72 sends a write pulse to a corresponding one of the reception memories 32-1 to 32-N based on the priority level, so the data packet is written in the corresponding one of the reception memories 32-1 to 32-N. As described above, the reception memories 32-1 to 32-N are storage elements which read out data to data bus 40 in response to a read signal and set the empty signal on whenever there is no data stored. Preferably, reception memories 32-1 to 32-N store data in the first in first out mode (FIFO memories).

The data bus 40 includes bus lines for transmitting data read out of the reception memories 32-1 to 32-N. On the other hand, the control busses 41-1 to 4-N have a group of signal lines for separately transmitting the empty signals fed from the reception memories 32-1 to 32-N and for separately transmitting the read signals to the reception memories 32-1 to 32-N.

Control Circuit

Figure 7:
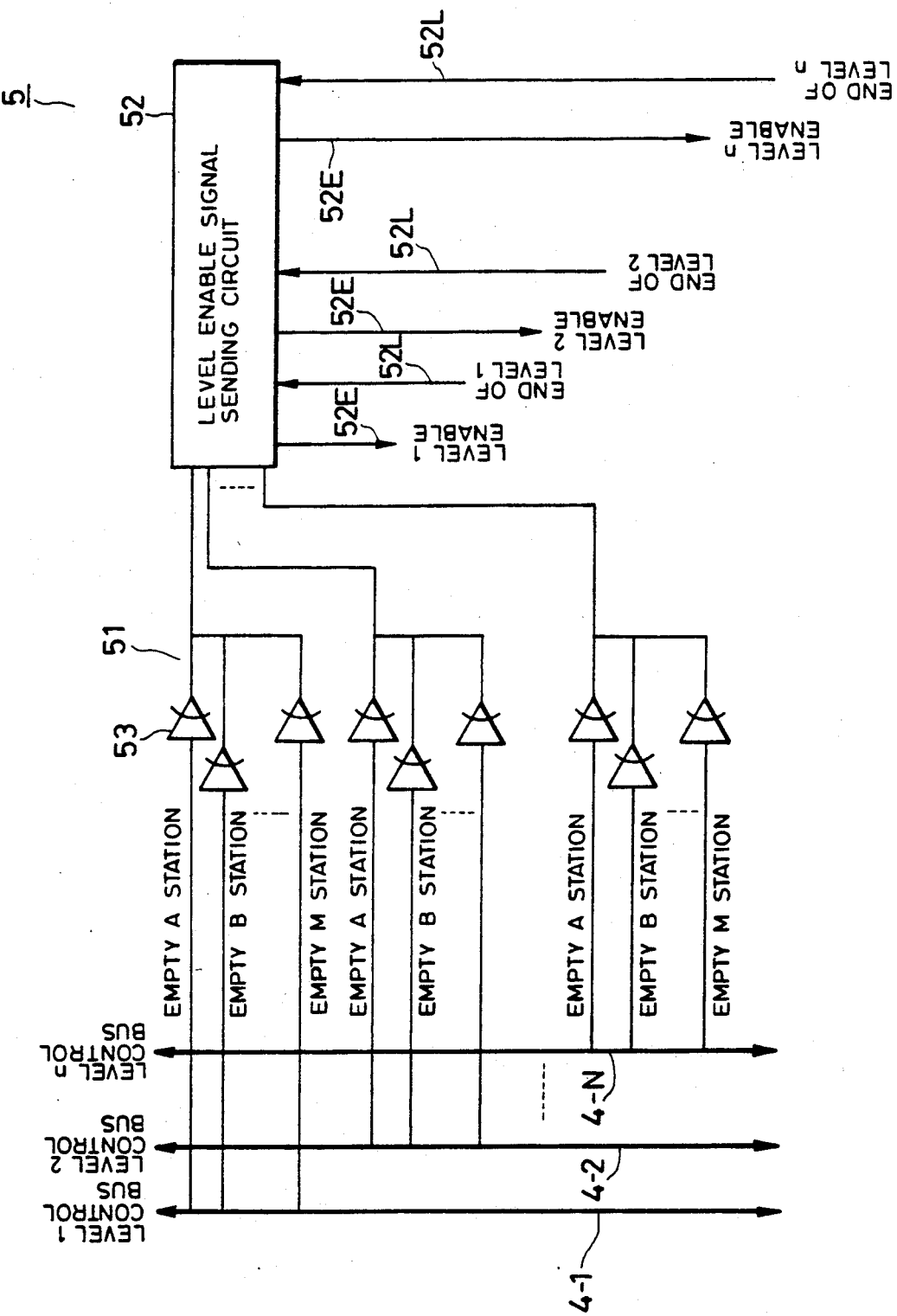
FIG. 7 is a detailed block diagram of the control circuit depicted in FIG. 4.

As illustrated in FIG. 7, the empty signal lines of reception memories (FIG. 6) are concentrated into control circuit 5. The empty signal lines (illustrated as "empty station A" - "empty station M" in the drawing) for the reception memories in each of the terminal stations 2A to 2M are collected through respective open collector buffers 53 corresponding to the levels of the memories, so that n wires OR circuits 51 are formed. The wired OR circuits 51 are connected so that the output signals thereof are fed to a level-enable signal sending circuit 52.

The empty signals of the reception memories of the respective levels are fed to the level-enable signal sending circuit through the respective wired OR circuits 51, so that the contents thereof are monitored at every level. When the data packet is stored in any one of the reception memories of the same level, the level-enable signal sending circuit 52 recognizes from the output of the wired OR circuit 51 that the empty signals of the level are off. When all of the reception memories are empty, the level-enable signal sending circuit 52 turns all level-enable signals 52E off. When the output of any one of the wired OR circuits 51 turns off, the level-enable signal sending circuit 52 turns a level-enable signal 52 on corresponding to the level.

Figure 4:
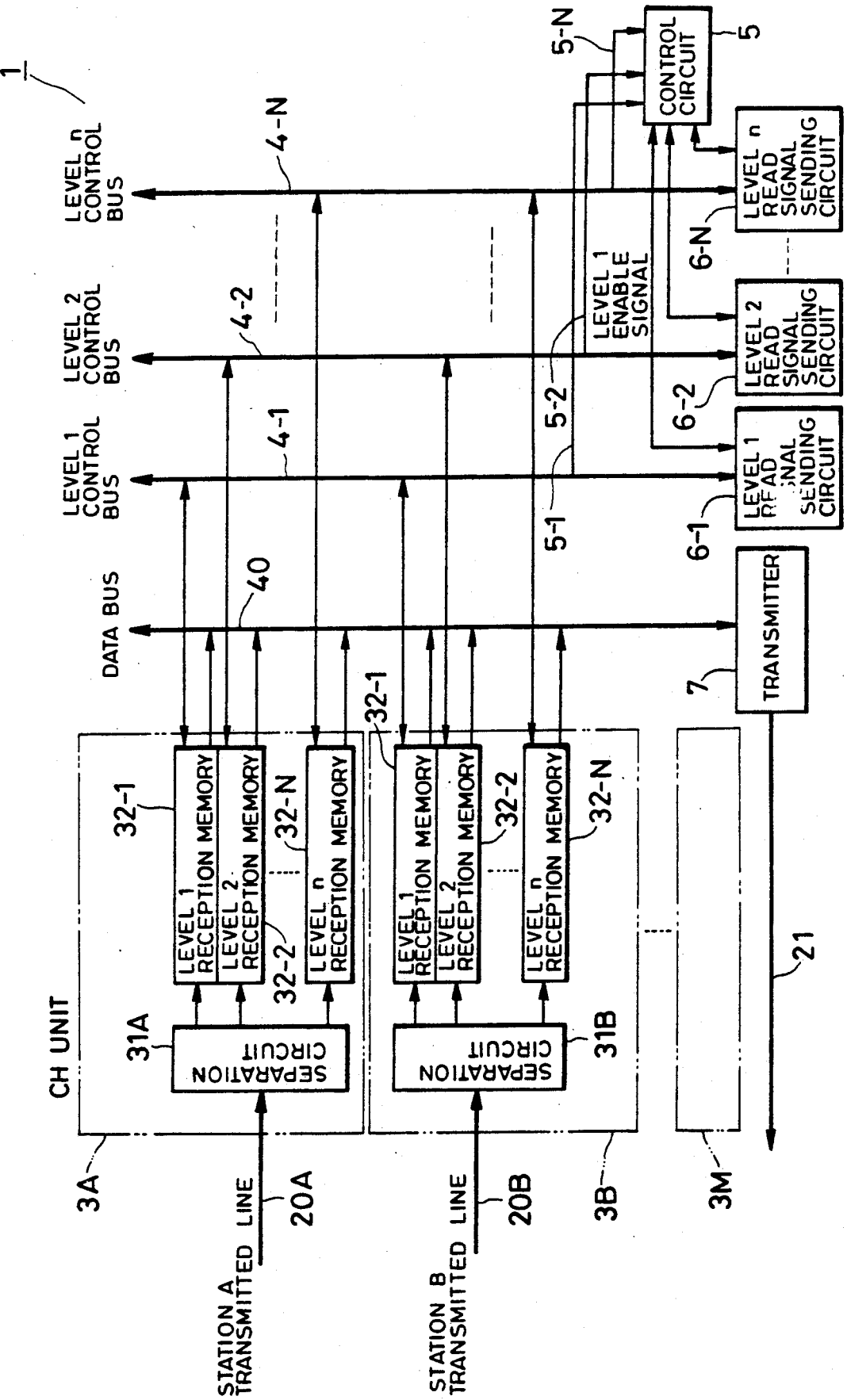
FIG. 4 is a block diagram showing a first embodiment of the toll center in the storage star network according to the present invention.
Figure 8:
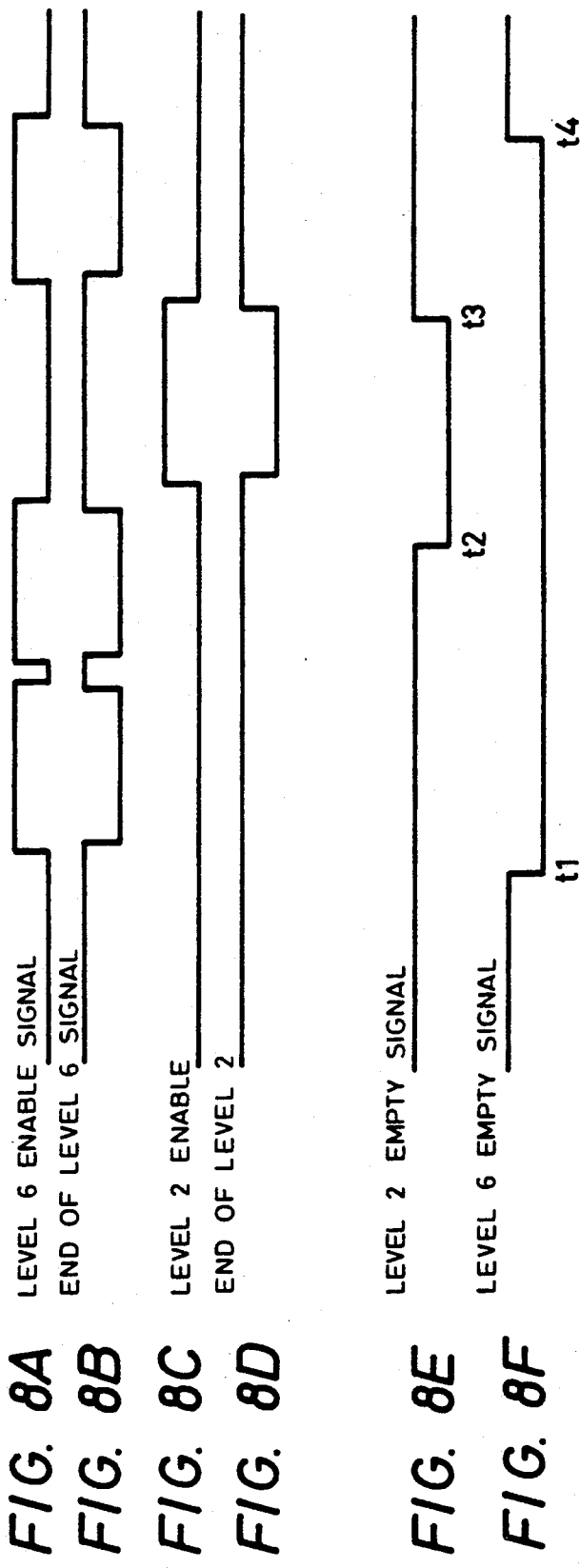
FIGS. 8A to 8F are timing diagrams of the operation of the invention.

For example, as shown in FIGS. 8A to 8F, when level-6-enable signal is turned on (FIG. 8A), read signal sending circuit 6-6 (FIG. 4) starts polling reception memories 32-6 of level 6. When read signal sending circuits 6-1 to 6-N (FIG. 4) are out of operation, circuits 6-1 to 6-N turn an end-of-level-sending signal 52L (FIG. 7), which is an input to level-enable sending circuit 52 (FIG. 8B), off. The end-of-level-sending signal 52L is turned on whenever the data packet is read from the reception memory of the same level (FIG. 8B). The level-enable signal sending circuit 52 turns the level-enable signal 52E on temporarily whenever the end-of-level-sending signal 52L of the same level as that of the level-enable signal currently in the ON state is turned on (FIG. 8A). Based on which data packet stored in the reception memories has the highest priority (for example, the highest priority is in level-2), according to the output of the wired OR circuit 51, the level-enable signal 52E corresponding to that level is turned on (FIGS. 8C and 8D).

In the case of FIGS. 8A to 8F, the level-6 empty signal fed from the reception memory is in the OFF state for a period between time t1 and time t4 (FIG. 8F), whereas the level-2 empty signal is in the OFF state for a period between time t2 and time t3 (FIG. 8E).

When only the level-6 empty signal is in the OFF state, polling is carried out successively on the level-6 reception memories corresponding to terminal stations A-M, respectively. However, if a data packet is put into a level-2 reception memory having higher priority after two level-6 reception memories are read out (FIGS. 8A and 8B), the data packet of the level-2 reception memory having higher priority is read out immediately (FIGS. 8C and 8D) and then the other level-6 reception memories are read out (FIGS. 8A and 8B).

As described above, the control circuit 5 controls polling of the reception memories according to priority.

Read Signal Sending Circuit

Figure 9:
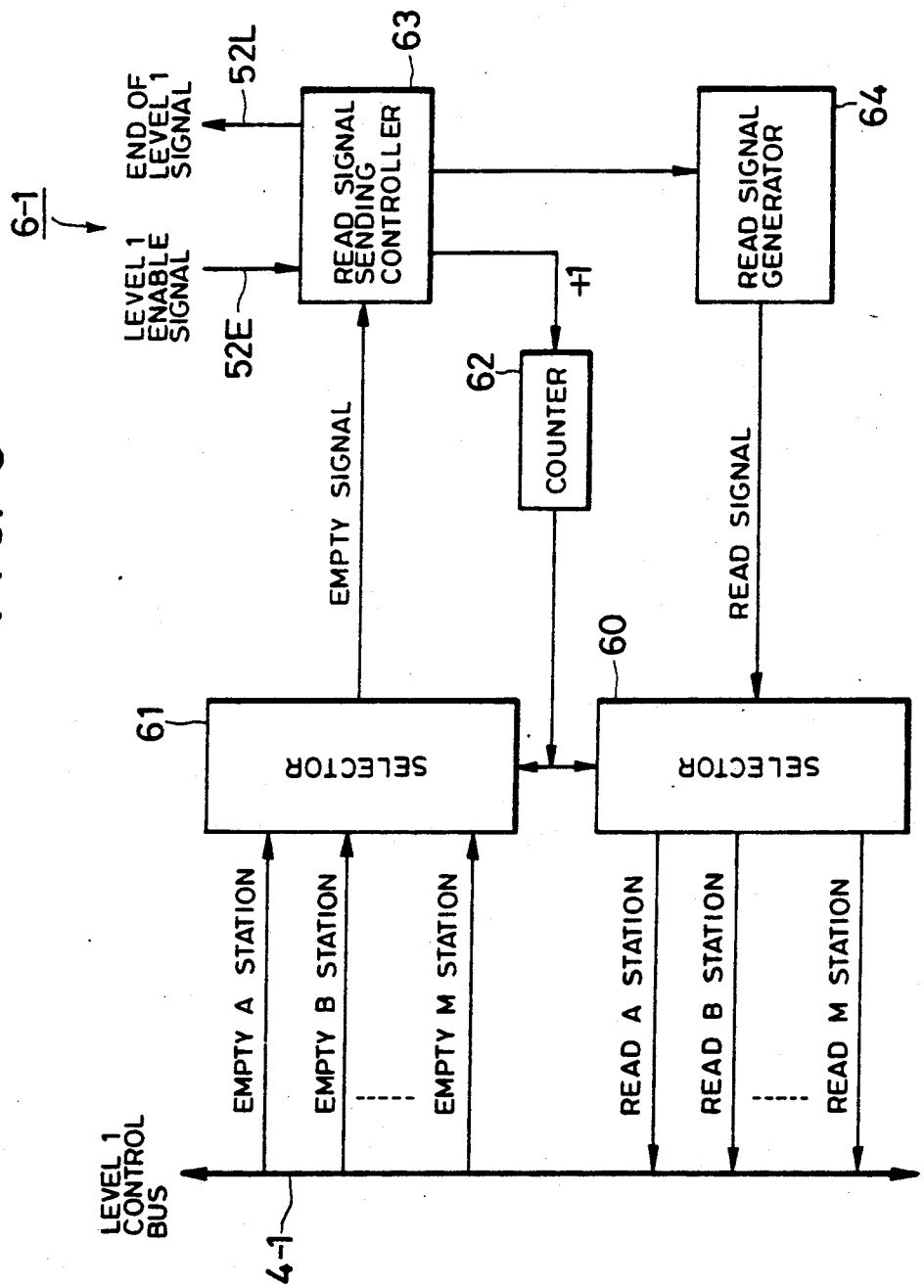
FIG. 9 is a detailed block diagram of the read signal sending circuit depicted in FIG. 4.

FIG. 9 shows an example of the level-1 signal sending circuit 6-1. The circuit has a selector 61 for receiving the empty signal lines (illustrated as "empty station A" to "empty station M" in FIG. 9) of the reception memories through the control bus 4-1, and another selector 60 connected to the reception memories through the read signal lines (illustrated as "read station A" to "read station M" in the drawing). Further, the circuit has a read signal sending controller 63, a counter 62, and a read signal generator 64.

Counter 62 is a circuit for generating a selection signal for controlling the operation of selectors 60 and 61. Assuming that the level-1-enable signal 52E output from the level-enable signal sending circuit 52 is active, the read signal sending controller 63 turns the end-of-level-1-sending signal 52L on and reads the empty signal of the station designated by counter 62 and selected by selector 61. If the empty signal is on, the counter 62 is incremented by one which results in selection of the next empty station signal by selector 61. The order which the level-1 empty signals are read depends on how selector 61 is set.

When read signal sending controller reads an inactive empty signal, read signal controller 63 transmits a send-request signal to the read signal generator 64 which then feeds a read signal to the read signal selector 60. Selectors 60 and 61 will be set so that counter 62 will designate the same station signals. Therefore, the read signal from read signal generator 64 will be transmitted through selector 60 to the level 1 reception memory corresponding to the same terminal station whose empty signal was read by read signal sending controller 63.

The read signal transmitted across level 1 control bus 4-1 will cause the data packet in the designated terminal station level 1 reception memory to be read out onto data but 40. Transmitter 7 will then transmit the data packet to all the terminal stations through the reception lines 21.

When the reception memory designated by counter 62 becomes empty, the empty signal is turned on so that the read signal sending controller 63 turns the send-request signal off. At the same time, the read signal generator 64 halts the operation of sending the read signal. Further, at the same time, the read signal sending controller 63 turns the end-of-level-1-sending signal 52L on. The operation after this is as described above using FIGS. 7 and 8A to 8F.

Use of Two-level Reception Memories

As described above, each CH unit of the toll center 1 is provided with a plurality of reception memories in which data packets are stored level by level according to the kind (priority) thereof so that the priority is established with respect to polling on the reception memories, whereby the priority can be established with respect to sending the data packets. Assuming that there are two levels of priority, packet transmission guaranteed to have a maximum propagation delay and packet transmission not guaranteed to have a maximum propagation delay can be formed in one system.

Figure 10:
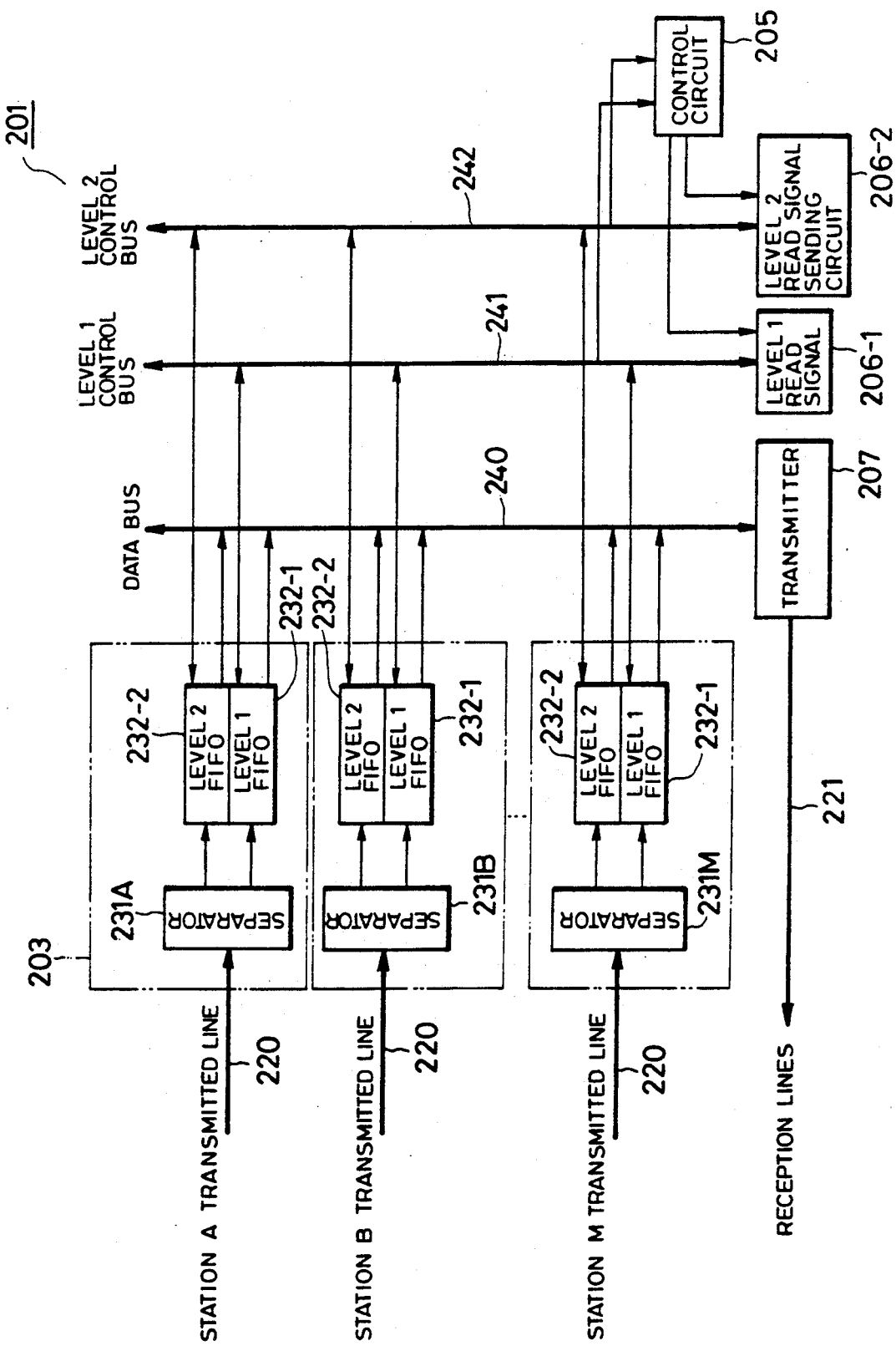
FIG. 10 is a block diagram of a second embodiment of the toll center using two-level reception memories.

FIG. 10 shows a second embodiment of the circuit according to the invention. This circuit is formed by replacing the reception memories 32-1 to 32-N in the circuit of FIG. 4 by reception memories 232-1 and 232-2 having two levels, level-1 and level-2. In each of FIGS. 4 and 10, like parts refer to like numerals for the purpose of avoiding duplication of description.

In this circuit, the level-1 reception memories having higher priority are assigned for data packet transmission guaranteed to have a maximum propagation delay such as audio signals, whereas the level-2 reception memories 232-2 having lower priority are assigned for data packet transmission not guaranteed to have a maximum propagation delay such as datagram signals.

CH Unit

Figure 11:
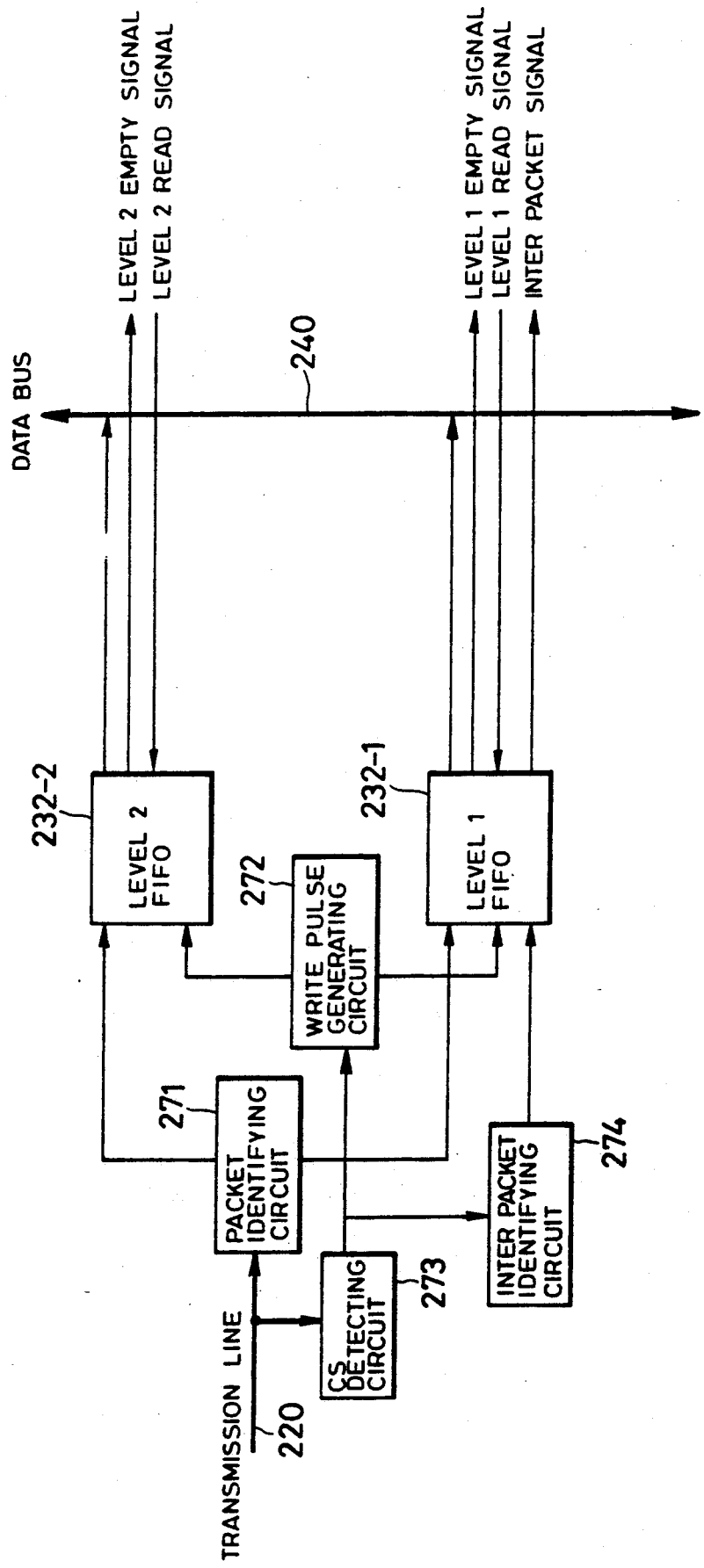
FIG. 11 is a detailed block diagram of the CH unit depicted in FIG. 10.

FIG. 11 is a block diagram showing the detail of the CH unit 203 in the circuit of FIG. 10.

This circuit has a carrier sense (CS) detecting circuit 273 for detecting a carrier from the data packet fed from the transmission line 220, and an interpacket detecting circuit 274 for detecting a break between two packets. Other circuit blocks are formed in the same manner as described above with reference to FIG. 6. CS detecting circuit 273 detects the carrier of the data packet while the beginning of the data packet is going into the packet identifying circuit 271. Upon detection of the carrier, CS detecting circuit 273 outputs an enable signal to write pulse generating circuit 272 to start writing the data packet to reception memories 232-1 or 232-2 depending on the level assigned by the packet identifying circuit 271.

In this embodiment, the interpacket detecting circuit 274 is provided to correspond to the case where the data packets written in the level-1 reception memories 232-1 having a guaranteed maximum propagation delay are of a so-called multichannel type. In this case interpacket detecting circuit 274 monitors the data packets written in the level-1 reception memories at once so that an identifier for expressing the boundary between packets can be inserted when the circuit 274 detects a break between the packets. For example, when the reception memories 232-1 are of a FIFO type capable of writing and reading 9-bit parallel data, eight bits (the first to the eighth) are used as data and the other bit (the ninth) is used as an identifier. Ordinarily, "1" is written in the ninth bit and "0" is written in the ninth bit of the last byte of the packet, whereby the interpacket detecting circuit can identify the boundary between packets on the FIFO read side. Accordingly, a plurality of packets can be continously or compactly written in the reception memories 232-1.

Control Circuit

Figure 12:
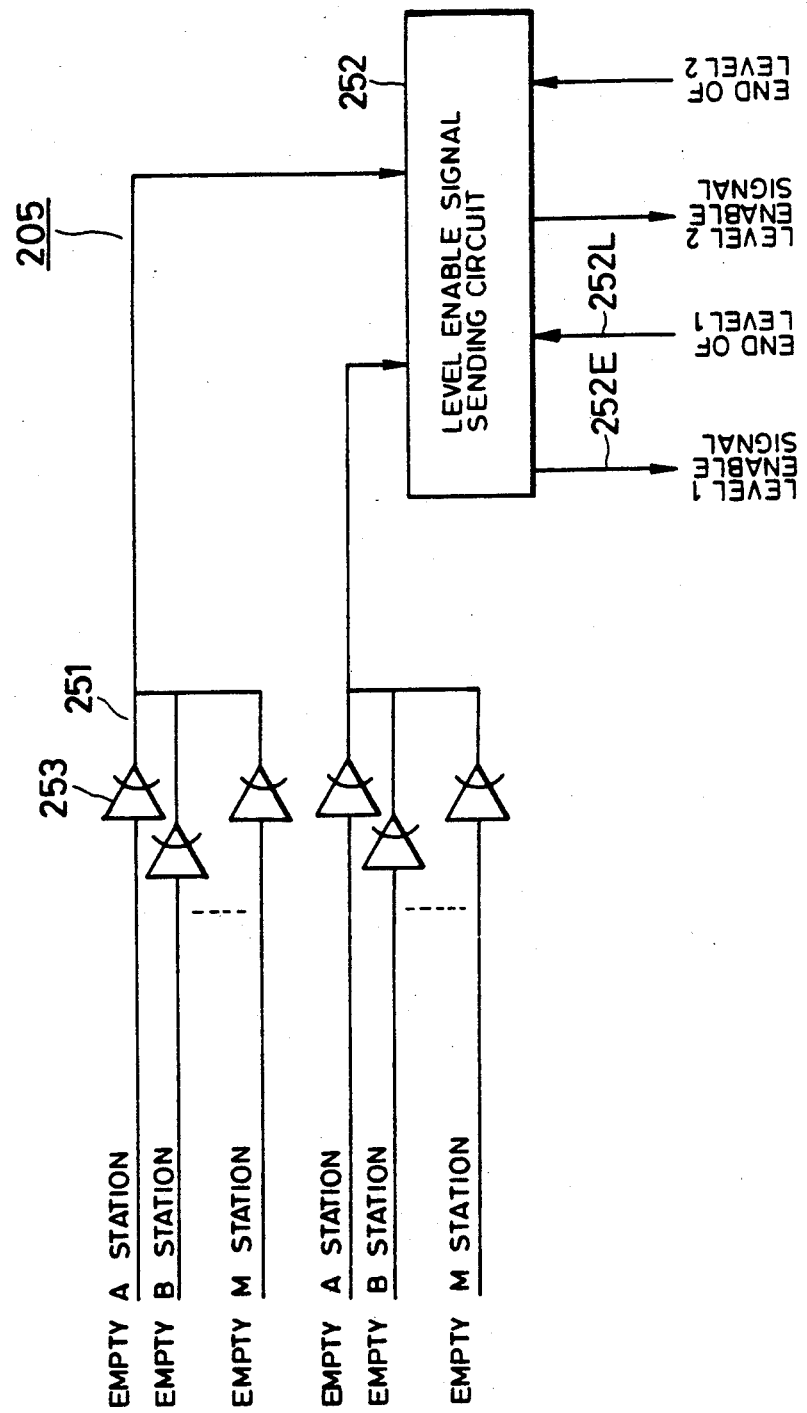
FIG. 12 is a detailed block diagram of the control circuit depicted in FIG. 10.

FIG. 12 is a wiring diagram of the control circuit 205.

The empty signal lines of the level-1 reception memories and the empty signal lines of the level-2 reception memories are collected through respective open collector buffers 253 (or in other words wired OR circuits are formed), so that the output signals are sent to the level-enable signal sending circuit 252. The operation of control circuit 205 is the same as the operation of control circuit 5.

Read Signal Sending Circuit

Figure 13:
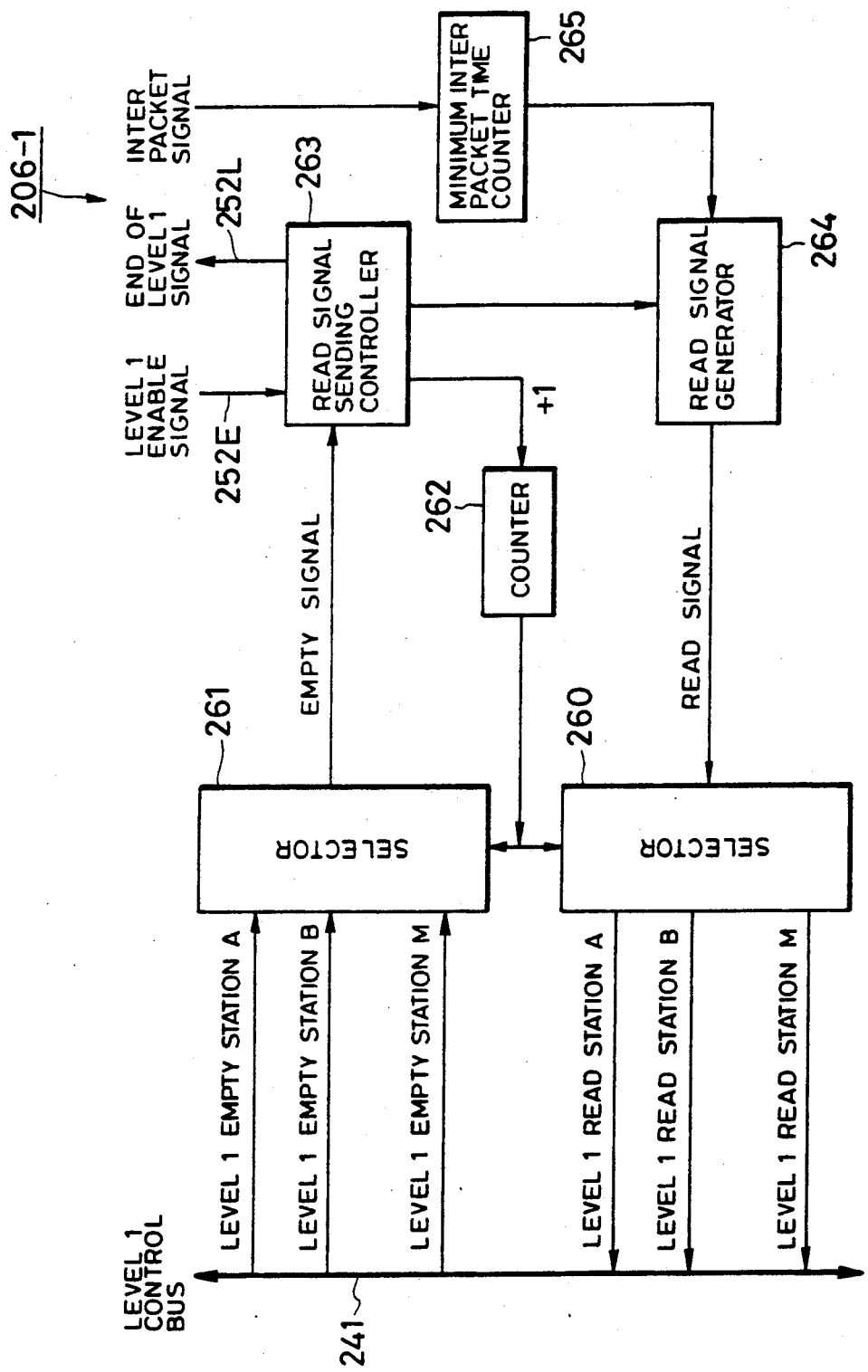
FIG. 13 is a detailed block diagram of the read signal ending circuit depicted in FIG. 10.

FIG. 13 shows the detail of the read signal sending circuit 206-1 of the level-1 reception memories.

The structure and operation of read signal sending circuit 206-1 is substantially the same as that for read signal sending circuit 6-1 of FIG. 9 except for the addition of a minimum interpacket time counter 265. Polling on the level-1 reception memories 232-1 is always prior to polling on the level-2 reception memories 232-2, so that packets of the level-1 reception memories 232-1 are read out prior to those of the level-2 reception memories 232-2.

The interpacket signal, which indicates the end of a packet, in the data read from the level-1 reception memories 232-1, as shown in FIG. 11, is an input to minimum interpacket time counter 265. When the interpacket identifier is detected, the level-1 read signal sending circuit 206-1 halts sending the read signal from the read signal generator 264 for a time period equal to the predetermined interpacket time for the system and then restarts the operation of sending the read signal.

The minimum interpacket time counter 265 is a circuit for counting the halt time after the interpacket identifier halts the operation of the read signal generator 264.

When the empty signal of level-1 reception memory 232-1 is turned off, reading the data packet stored in the reception memory is started. While the data packet is read, minimum interpacket time counter 265 monitors the interpacket identifier. When the interpacket identifier equals "0", the output of minimum interpacket time counter 265 causes read signal generator 265 to stop sending the read signal for the minimum interpacket time period determined for the system.

After the minimum interpacket time period, the output of minimum interpacket time counter 265 causes read signal generator 264 to resume sending the read signal to the reception memory. In the case where the reception memory becomes empty and where another level-1 reception memory is not empty, polling on level-1 is continued till all level-1 reception memories become empty. Thus, polling on level-1 is completed. After polling on level-1, polling on level-2 is started if the level-2 reception memory 232-2 is not empty. If all level-2 reception memories are empty, the system enters a wait state till any one of the empty signals of level-1 or level-2 is turned off.

According to the aforementioned circuit using two-level reception memories, data packets sent from terminal stations guaranteed to have no more than a maximum propagation delay are all put into the level-1 reception memories 232-1 (FIG. 10). If only one packet is stored in the level-1 reception memories 232-1 of the toll center, this state can be detected by the control circuit 205 and the read signal sending circuits 206-1 and 206-2 to thereby start polling the level-1 reception memories 232-1. In the case where the the level-2 reception memories 232-2 are not empty and where one of the level-2 reception memories 232-2 is now read, polling on the level-1 reception memories 232-1 is started after reading the data packet of the level-2 reception memory no matter whether the other level-2 reception memories are empty or not.

The capacity of the reception memories must be determined so that data packets can be continuously read within the range of maximum propagation delay time if data packets are stored in all the level-1 reception memories 232-1. According to the determination of the capacity, polling on all the level-1 reception memories can always be carried out within the range of maximum propagation delay time.

For the purpose of a guaranteed maximum propagation delay, it is necessary to limit the storage capacity of the reception memories. As the level-1 packets in this circuit are guaranteed to have a maximum propagation delay, the packet quantity simultaneously stored in the level-1 reception memories of the toll center is limited. The method of limiting the packet quantity is separated into two types as follows, stationary allocation type and dynamic allocation type. The maximum propagation delay D in the level-1 data packets is expressed by the equation:

$$D = (M1 + M2)/S \text{ (sec)}$$

where M1 represents maximum packet length (bits) simultaneously stored in the level-1 reception memories, M2 represents maximum packet length (bits) simultaneously stored in the level-2 reception memories, and S represents the transmission velocity (bit/sec) in communication line, and where each of M1 and M2 contains one part minimum interpacket bit length per one packet.

Modification

Although the aforementioned second embodiment has shown the case where two-level reception memories are provided to form packet transmission guaranteed to have a maximum propagation delay and packet transmission not guaranteed a maximum propagation delay on one system, the invention is applicable to the case where multi-level reception memories are provided. For example, assuming a six-level system, packet transmission warranted in maximum propagation delay can be carried out in the respective levels as long as the storage quantity of the reception memories is limited in the respective levels. If the storage quantity in each of level-4, level-5 and level-6 is not limited, the packet transmission in each of the levels cannot be warranted in maximum propagation delay but the packet transmission can be carried out with priority.

Figure 14:
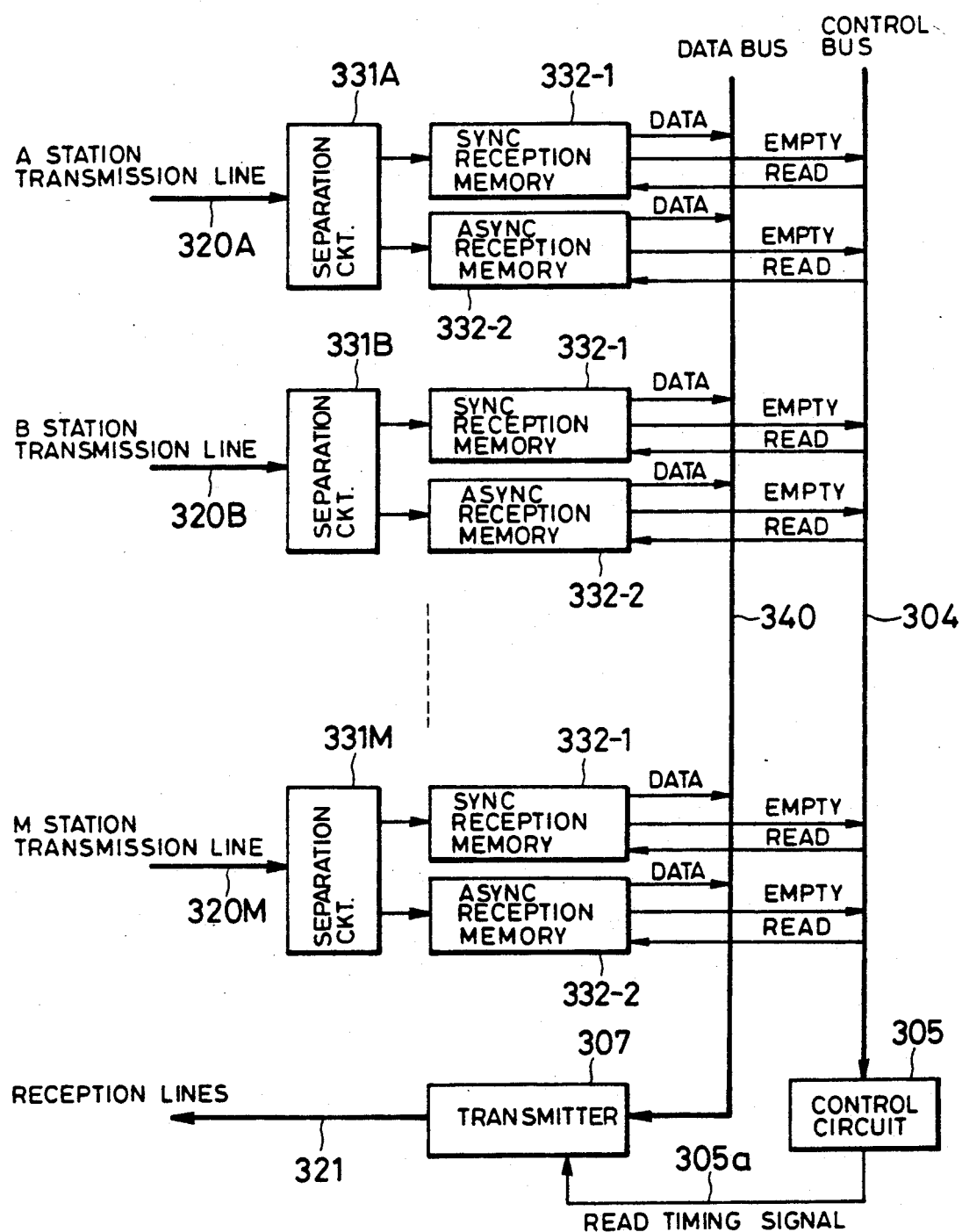
FIG. 14 is a block diagram showing a third embodiment of the toll center in the storage star network according to the present invention.

FIG. 14 is a block diagram of a toll center in the storage star network according to a third embodiment of the present invention.

Transmission lines 320A to 320M of terminal stations are respectively connected to separation circuits 331A to 331M provided for each terminal. Reception memory (async reception memory) 332-2 is connected to each separation circuit 331A to 331M.

Each of the reception memories 332-1 and 332-2 has a capacity not less than the maximum length of a packet sent from a terminal station, so that collision does not occur if packets are sent from all the terminal stations. Each of the reception memories 332-1 and 332-2 has the function of turning the empty signal on when data is absent, and the function of turning the empty signal off when data is present. The empty signal is fed to a control circuit 305 through a control bus 304. Whenever a read signal is fed from the control circuit 305, a corresponding one of the reception memories 332-1 and 332-2 sends the stored data packet onto the data bus 340 in order starting from the head. After sending, the empty signal is turned off. Preferably, each of the memories is formed of a first-in first-out memory (FIFO).

A transmitter 307 is a circuit connected to the data bus 304, for receiving a read timing signal 305a from the control circuit 305, and for sending a data packet read from one of the reception memories 332-1 and 332-2 to the respective terminal stations through reception lines 321.

In accordance with another embodiment of the invention, a storage star network comprises a plurality of terminal stations for transmitting synchronous and asynchronous data packet, a toll center for receiving the data packets transmitted by said plurality of terminal stations and for transmitting data packets to the plurality of station terminals and, included in the toll center a plurality of reception memories associated with each of said plurality of terminal stations for temporarily storing data packets received from said plurality of terminal stations wherein said plurality of reception memories include a plurality of synchronous data reception memories having at least one associated with each of said plurality of terminal stations for storing synchronous dataw packets and a plurality of asynchronous data reception memories having at least one associated with each of said plurality of terminal stations for storing asynchronous data packets.

As embodied herein and illustrated by the circuit of FIG. 14, data packets sent from the respective terminal stations are classified into two types, that is, a sync type and an async type, by identifiers preliminarily written in the data packets. The data packets of the former type are stored in the async reception memory 332-1.

Control circuit 305 monitors the conditions of the respective reception memories on the basis of the empty signals generated from the reception memories 332-1 and 332-2, and sends a read signal to one reception memory selected according to a predetermined rule. At the same time, the send timing signal 305a is fed to the transmitter 307, so that the data packet read from the reception memory which has received the read signal is sent sent to the respective terminal stations through the transmitter 307.

Control Circuit

In the following, the construction and operation of the control circuit 305 is described in detail.

Figure 15:
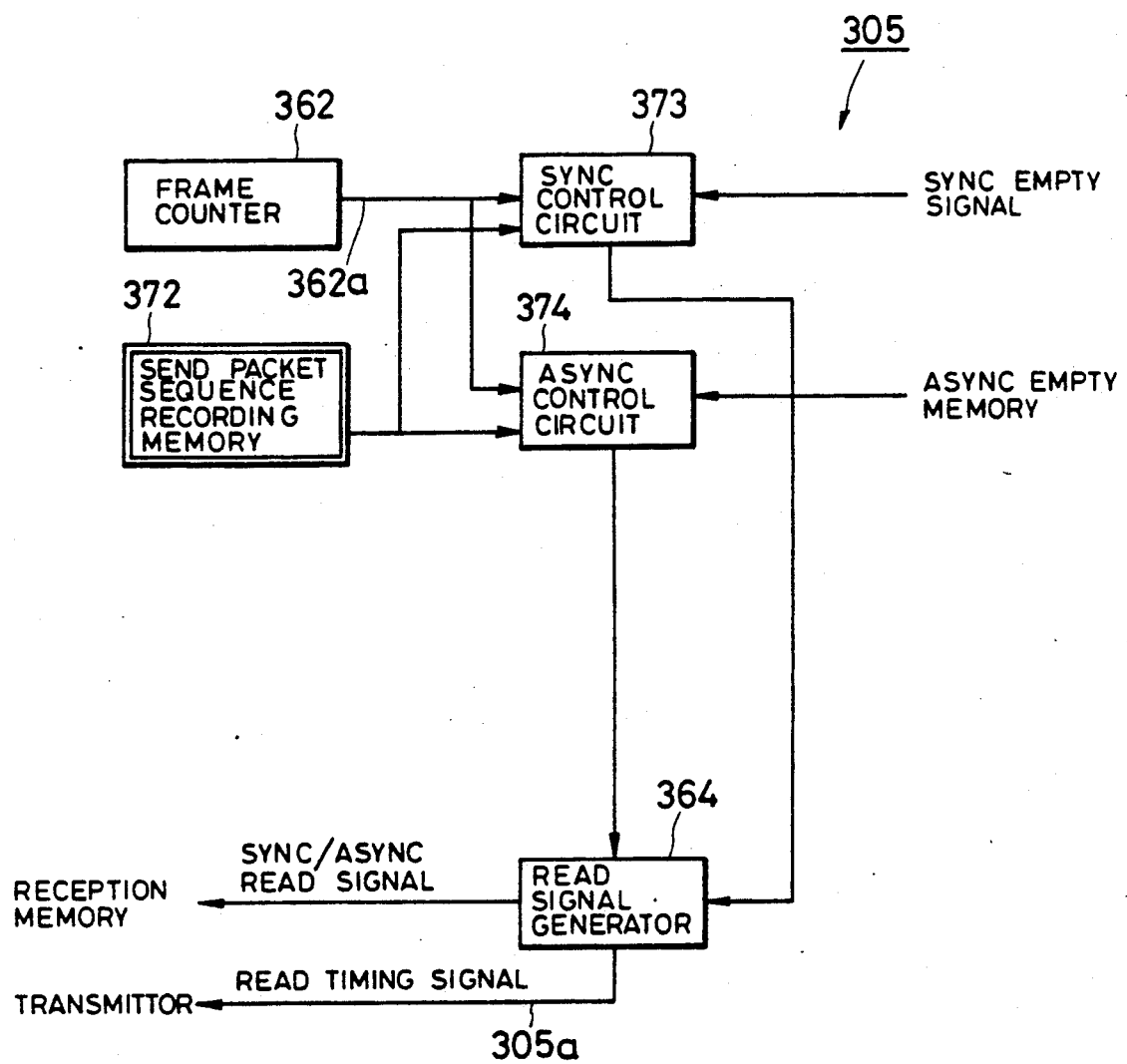
FIG. 15 is a detailed block diagram of the control circuit thereof.

FIG. 15 is a detailed block diagram of the control circuit.

This circuit comprised of a frame counter 362, a send packet sequence recording memory 372, a sync control circuit 373, async control circuit 374, and a read signal generator 364.

In accordance with the invention, the toll center includes a means for designating a given time frame. Preferably, the frame counter 362 is a circuit for generating a frame timing signal 362a once in a predetermined time frame T (hereinafter merely called "frame"). All the operations of the control circuit 305 are made on the basis of the frame as a unit.

Figure 16:
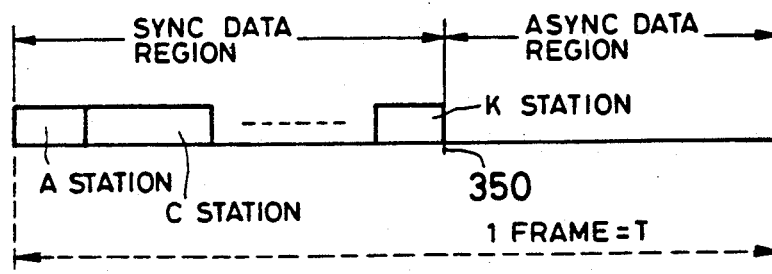
FIG. 16 is a time chart showing the structure of one frame thereof.

One frame is separated into two regions, that is, a sync data region and an async data region as shown in FIG. 16. The boundary 350 of the two regions varies dynamically. The sync data region is used for reading of the sync reception memory 332-1 in the order of predetermined sequence to read the data packet stored therein and send it. The information for the polling sequence is stored in the send packet sequence recording memory 372. For example, in the case of FIG. 16, polling with respect to the sync data region is carried out on the sync reception memories in the order of the station A, the station C, . . . the station K. In this case, not all the sync reception memories for the terminal stations are polled. Only one specific terminal station within the range of from the station A to the station M can be selected. As for the other terminal stations, async reception memories are used for polling with respect to the async data region. With respect to the async data region, any vacant station can be used without specification.

More particularly, in the toll center, sync reception memories 332-1 and async reception memories 332-2 are prepared for each terminal station, but only specific terminal stations are permitted to send sync data to the sync reception memories 332-1. All terminal stations except for specified stations must use the async reception memories 332-2. Of course, specified terminal stations may send async data.

In accordance with the invention there are means for transmitting said synchronous data packets at the start of said given time frame and indicating that all synchronous data packets at the start of said given time frame and indicating that all synchronous data packets available for transmission have been transmitted and means for transmitting said asynchronous data in response to said means for indicating and said means for designating a time frame wherein said asynchronous data packets are transmitted before the beginning of the next time frame. Preferably, sync control portion 373 is a circuit for polling the empty signals from the sync reception memories 332-1 in the order on the basis of the information relating to the polling sequence registered with the send packet sequence recording memory 372. If the empty signal thus polled is off, the data packet stored in the corresponding reception memory is read and sent to the reception lines 321 for the respective terminal stations through the transmitter 307. If the empty signal thus polled is on, the empty signal of the next reception memory registered with the send packet sequence recording memory 372 is polled because there is no data packet being transmitted from the terminal. These procedures are repeated with respect to all the information registered with the send packet sequence recording memory 372. When the polling treatment of the sync reception memories are completed with all of the stations registered with the send packet sequence recording memory 372, the operation is shifted from the sync data region to the async data region so that control is shifted to the async control portion 374.

Although this embodiment has shown the case where the contents of the send packet sequence recording memory 372 are stationary to thereby preliminary limit terminal stations permitted to send sync data, it is to be understood that the invention is applicable to the case where the contents of the memory vary dynamically. In the case where the contents of the send packet sequence recording memory 372 are changed, async data packets may be used or other data packets for reporting data to the toll center except that sync/async data packets may only be used under the condition that exclusive reception memories are separately provided for these data packets.

On the other hand, after the situation of control is shifted from the sync control portion 373 to the async control portion 374, async empty signals fed from the async reception memories 332-2 are respectively polled. If the empty signal thus polled is off, a read signal is sent out to read the data packet stored in the corresponding reception memory. If the empty signal thus polled is on, polling is continued on the next memory. These procedures are repeated on the respective stations till the frame ends. More particularly, the sync reception memories 332-1 are polled in one sequence of the predetermined order before control is shifted to the async data region, whereas the async reception memories 332-2 can be repeatedly polled a suitable number of times in the predetermined order as long as the polling is carried out within vacant time within the async data region of a frame.

In this case, if the polling sequence for the async data packets is constant, the priority for the respective terminal stations sending async data is decided. In other words, if vacant time (async data type) is short, it takes a great deal of time to poll a lower-priority terminal station. Accordingly, in the case where a terminal station should have high priority, the polling sequence can be established so that the station can be polled in high priority. Contrarily, in the case where the priority among terminal stations should not be provided, the polling sequence can be established so as to be staggered every time or decided by using random numbers. Also, in this case, the polling sequence is fed from the send packet sequence recording memory 372 to the async control portion 374.

Further, various kinds of async data reception memories may be provided to perform packet switching with different priorities for reception memories. More particularly, in a fourth embodiment of the invention, reception memories for async data are increased in kind to differentiate priorities in the manner as described above. By a packet identifying circuit not shown and provided in the input portion of the toll center, the priority of the data packet put into the circuit is identified. The data packet thus identified by the circuit is fed to a corresponding reception memory. In this case, polling on the reception memories can be carried out for example in the async data region in the order of priority.

The read signal generator 364 is a circuit for generating a read signal for a sync reception memory 332-1 or async reception memory 332-2 according to the instruction of the sync control circuit 373 or async control circuit 374. This circuit sends a read timing signal for the transmitter 307 at the same time the read signal is sent out. The read signal generator 364 is connected to all the reception memories respectively singly through control lines, so that read signals can be transmitted respectively through the control lines. For example, the read signal generator 364 is constructed so that, when an address signal specifying a reception memory is fed from sync control circuit 373 or async control circuit 374 to read signal generator 364, a selector provided in the read signal generator 364 can select corresponding one of the control lines to thereby select a read signal.

The storage star network having the aforementioned construction according to a fourth embodiment of the present invention operates as follows. An example of the operation will be described by using the time chart of FIG. 17.

Figure 2:
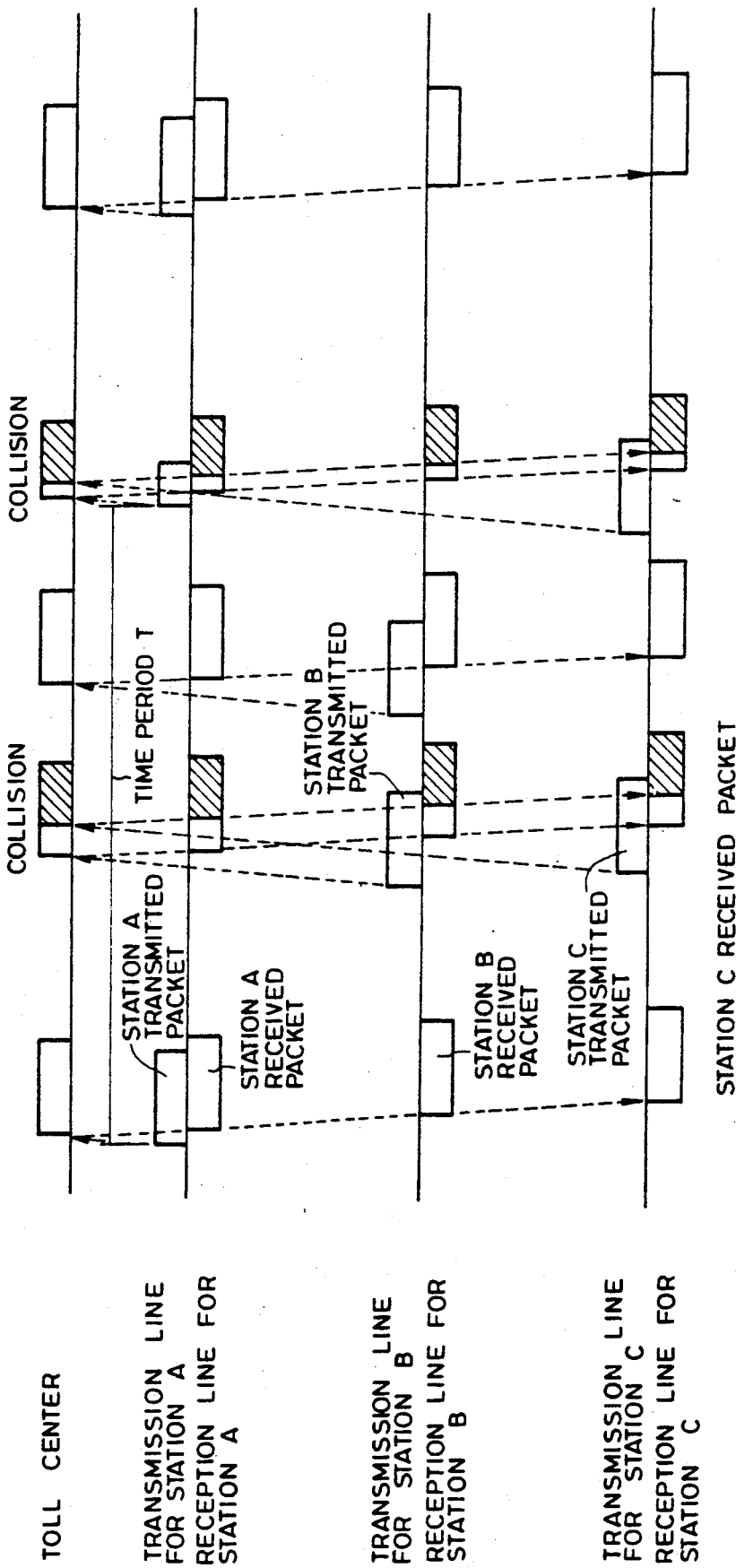
FIG. 2 is a time chart showing the operation of the star network of FIG. 1.
Figure 17:
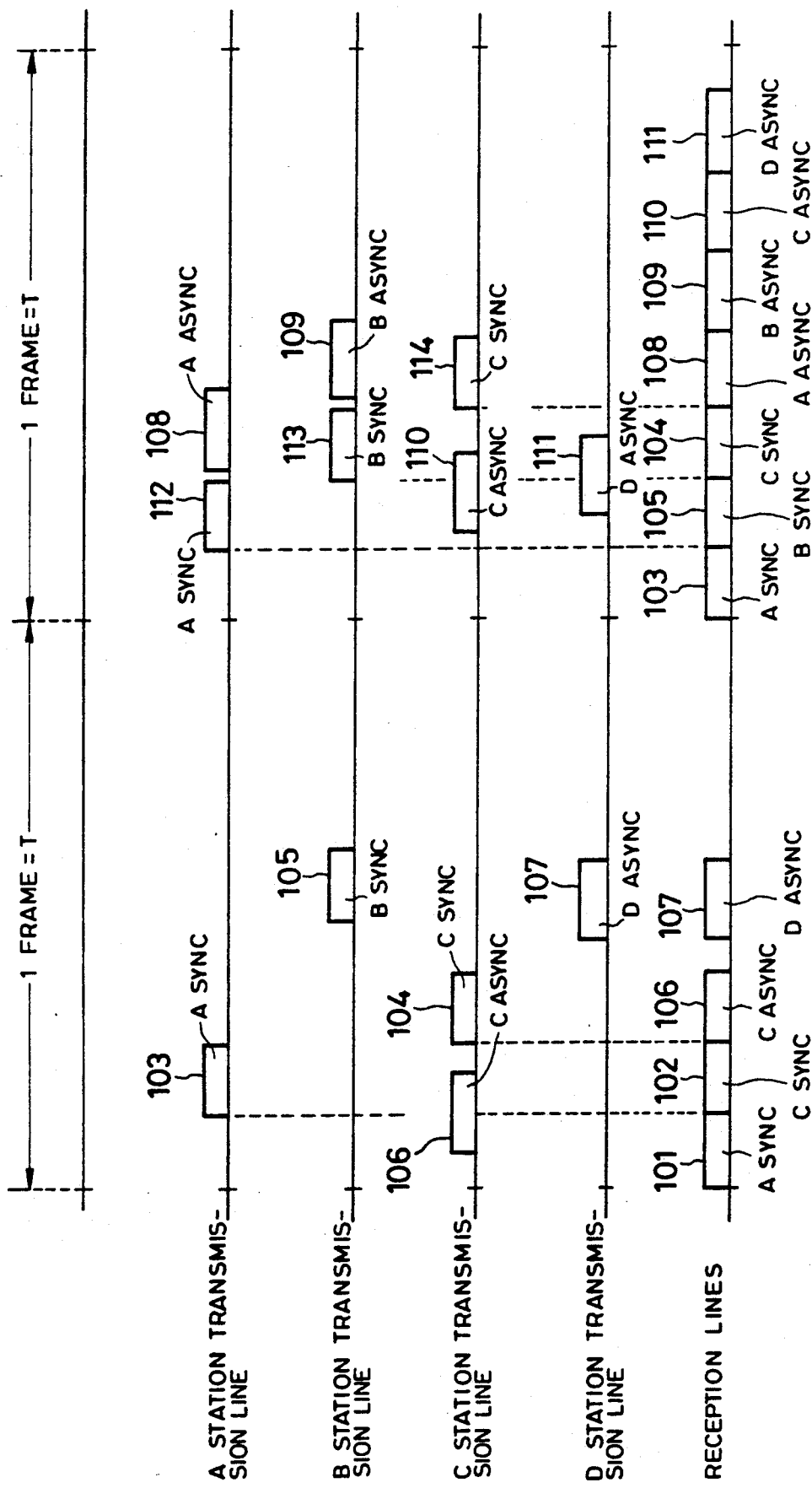
FIG. 17 is a timing diagram showing the operation of the storage star network according to a fourth embodiment of the invention.

In this embodiment, it is assumed that the four terminal stations, the station A to the station D, are connected to the toll center. Further, it is assumed that each of the stations A, B and C serves doubly to transmit a sync data packet and to transmit an async data packet and that the station D serves singly to transmit an async data packet. The polling sequence for the sync reception memories is written in the send packet sequence recording memory 372 of FIG. 15, for example, in the order A, B and C, whereas the polling sequence for the async reception memories is written therein for example in the order of A, B, C and D. The time chart of FIG. 17 is different from that of FIG. 2A in that FIG. 17 is prepared regardless of signal delay produced in propagation over the signal line.

Referring to the first frame, it is now assumed that the data packets 101 and 102 sent from station A and the station C before start of the frame have been stored in the reception memories 332-1 (FIG. 14). The frame timing signal 362a (FIG. 15) for start of the first frame is input to the sync control circuit 373. The sync control circuit 373 makes pollings on the sync reception memories 332-1 (FIG. 14) in the order of A, B and C, feeds read signals to the reception memories of the station A and the station C, where the empty signals are off, and sends the sync data packet 101 of the station A and the sync data packet 102 of the station C to the reception lines for the respective terminal stations as shown in FIG. 17.

Thus, processing with respect to the sync data region in this frame is finished. Accordingly, the sync data packets 103, 104 and 105 sent from the station A, the station B and the station C after start of this frame are not processed in this frame, because polling is finished before the packets are stored in the reception memories. The sync data packets 103, 104 and 105 are processed in the next frame.

When processing with respect to the async data region is started, the async data packet 106 sent from the station C just before the start of the async data region and stored in the async reception memory is read by the async control circuit 54 and sent to the reception lines for the respective terminal stations. After processing with respect to the sync data region in this frame is finished, processing of async data packets are devotedly continued till one frame is finished. Accordingly, the data packet 107 sent form the station D during the processing of async data packets is immediately sent to the reception lines for the respective terminal stations. In this embodiment, all the async data packets sent from the respective terminal stations in the period of this frame are immediately simultaneously broadcast because the async data region is sufficiently long. However, in the case where there are many sync data packets and where the sync data region is long, all async data packets may not be polled in this frame though the async data packets have been stored in the async reception memories.

In the next frame, the sync data packets 103, 105 and 104 sent from the station A, the station B and the station C in the prior frame are polled in that order and simultaneously broadcast. After the sync data packets are broadcast, the async data packets 108, 109, 110 and 111 sent from the station A, the station B, the station C and the station D in this frame are simultaneously broadcast. The sync data packets 112, 113 and 114 sent from the station A, the station B and the station C in this frame are processed in the next frame.

On the other hand, each terminal station is kept in the packet sending disable state after sending a packet to the toll center. When the terminal station recognizes that the intra office packet is returned from the toll center, the terminal station switches back to the packet sending enable state again. It is however possible to send different kinds of packets simultaneously, because there are multiple reception memories.

Construction of Blocks

Figure 18:
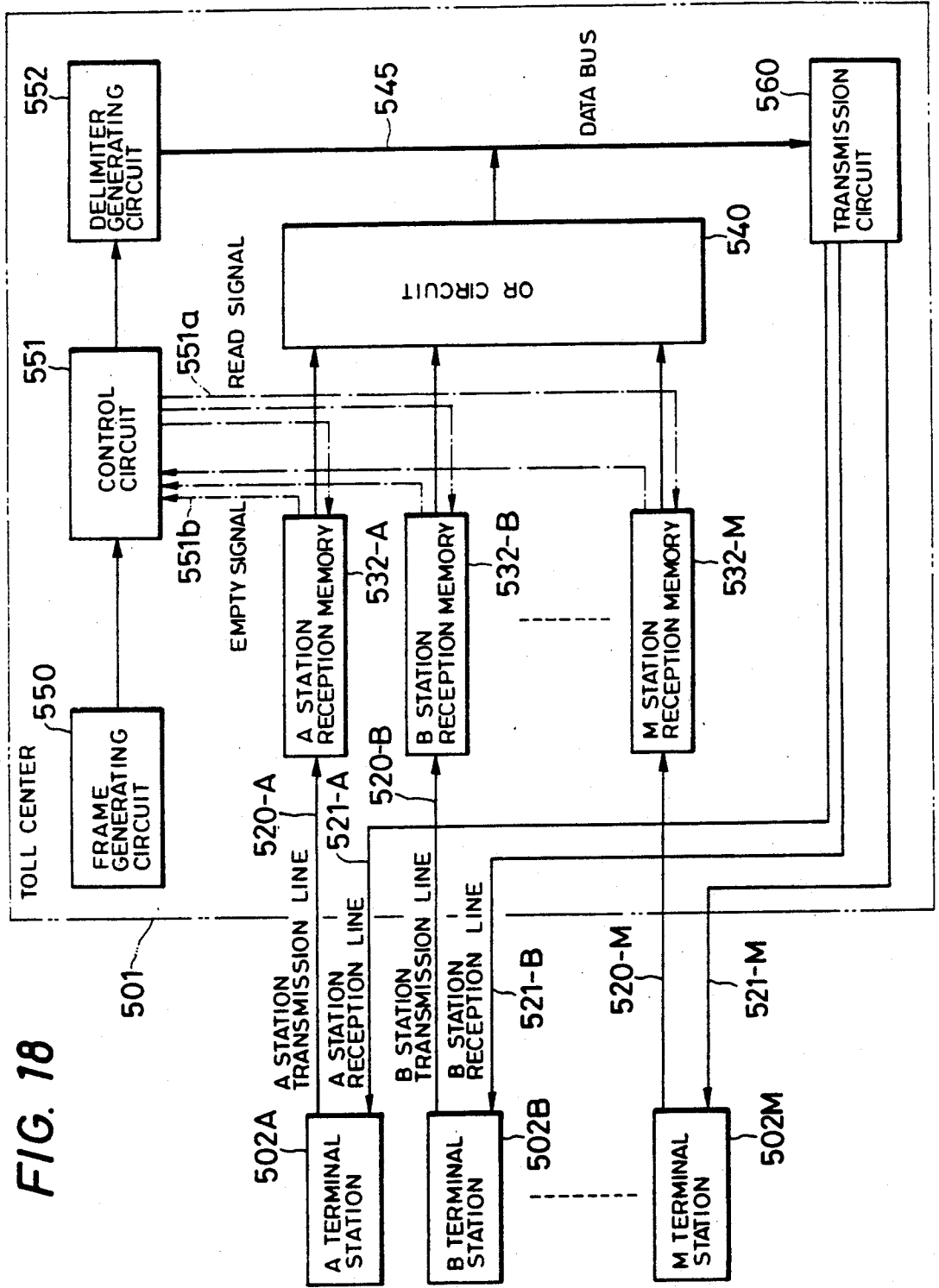
FIG. 18 is a block diagram showing a fifth embodiment of the storage star network according to the present invention.

FIG. 18 is a block diagram showing a fifth embodiment of the storage star network according to the present invention.

In the storage star network according to the invention, a plurality of terminal stations 502A to 502M are connected to a toll center 501 through two-way communication lines including transmission lines 520A to 520M and reception lines 521A to 521M. The toll center 501 has the following block structure.

Reception memories 532A to 532M for temporarily storing signals sent from the respective terminal stations 502A to 502M are provided in the toll center 501 and respectively connected to the transmission lines 520A to 520M. Further, the toll center 501 has a frame generating circuit 550, a control circuit 551 for controlling the frame generating circuit 550, a delimiter generating circuit 552, an OR circuit 540, and a transmission circuit 560. The size of the reception memories 532-A to 532-M in the toll center 501 is found by the following relation.

(Size of Reception Memories) > (Maximum Reciprocating Propagation Time) × (Transmission Rate)

In this relation, the "maximum reciprocating propagation time" is the time (second) required for signal propagation between the toll center 501 and the farthest one of the terminal stations, and the "transmission rate" is the number of signal bits which can be transmitted for a second.

According to this relation, collision never occurs even though all the terminal stations simultaneously send signals. Each of the reception memories has the double function of turning the empty signal 551b on when data are absent, and of turning the empty signal 551b on when data are present. For example, each of the reception memories is formed of a first-in first-out memory (FIFO).

The frame generating circuit 550 is arranged to trigger the control circuit 551 with a predetermined cycle to thereby decide timing for generating a multi-addressing frame to be simultaneously multi-addressed to the respective terminal stations.

The control circuit 551 is arranged to put out a read signal 551a to each of the reception memories 532A to 532M to read a frame stored therein. The delimiter generating circuit 552 is arranged to generate a frame header onto a data bus 545. The OR circuit 540 is arranged to obtain a logical sum among the frames fed from one of the respective reception memories 532A to 532M and feeds a result of ORing onto the data bus 545. Transmission circuit 560 is arranged to receive the frame from data bus 545 so as to simultaneously multi-address the frame to the terminal stations through reception lines 521A to 521M.

- Circuit Operation

The thus arranged storage star network according to the present invention operates as follows:

Frames sent from the respective terminal stations 502A to 502M are received in the respective reception memories 532A to 532M. Upon detection of a frame header, each of reception memories 532A to 532M takes in data following the frame header. After taking in data, each of the reception memories 532A to 532M turns empty signal 551b off.

Frame generating circuit 550 periodically triggers the control circuit 551. In response to the trigger, control circuit 551 feeds a read signal 551a to all of reception memories 532A to 532M having empty signal 551b in the off state to thereby start reading of the corresponding frames. Control circuit 551 continues to send read signal 551a to reception memories 532A to 532M having empty signal line 551b in the off state, till the empty signals 551b of all the reception memories 532A to 532M are turned on. Further, control circuit 551 actuates delimiter generating circuit 552 to generate a frame header.

Each of the reception memories 532A to 532M send data to the OR circuit 540 starting from the beginning of the input data at the time the reception memory receives the read signal 551a from the control circuit 551. Upon completion of sending the data, each of reception memories 532A to 532M turns empty signal 551b on. OR circuit 540 makes a logical sum among the input signals and feeds the ORed output to the transmission circuit 560 through the data bus 545. Transmission circuit 560 makes the output data of the OR circuit 540 follow the frame header generated from the delimiter generating circuit 552, and then simultaneously multi-addresses the thus composed frame onto the respective reception lines 521A to 521M.

The timing for sending the frames of the respective terminal stations 502A to 502M is just after time T decided by the following equation counting from the point in time of reception of the frame header from the toll center 501.

T = (Frame Period) − (Maximum Reciprocating Propagation Delay Time)

According to the equation, the frames synchronously sent from the respective terminal stations 502A to 502M are always almost simultaneously stored in the respective reception memories 532A to 532M of the toll center 501.

Figure 19:
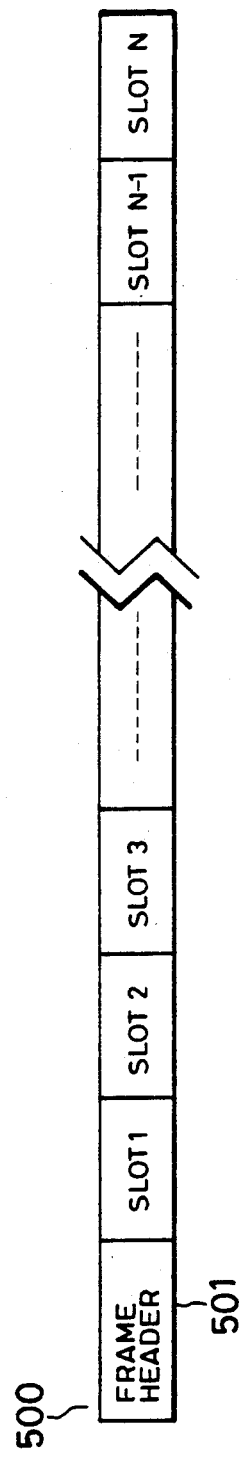
FIG. 19 is a drawing showing the structure of the frame sent from the terminal station.

The format of the frame is shown in FIG. 19. The frame header for identifying the frame is provided at the head. Slots 1 to N follow the frame header. The numerical value of N is decided from the slot length (bits), the frame header (bits), the frame period (sec), the network transmission rate (bits per sec), and the maximum reciprocating propagation delay time (sec).

$$N \leq [\text{Network Transmission Rate} \times \{\text{Frame Period} - \text{Maximum Reciprocating Propagation Delay Time}\} - \text{Frame Header}]/[\text{Slot Length}]$$

Figure 20:
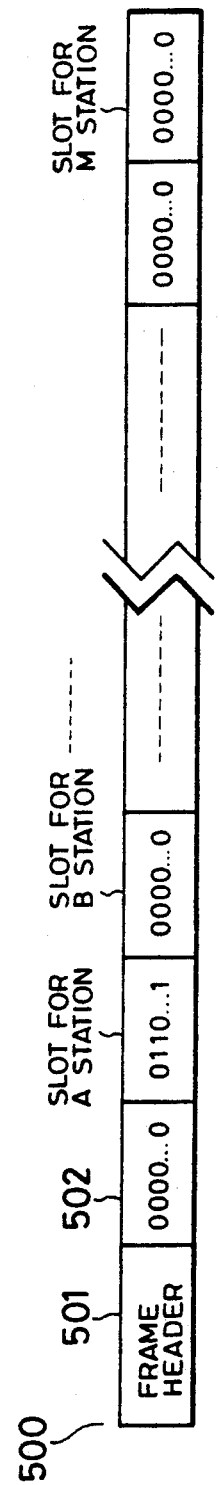
FIG. 20 is a drawing showing the structure of the frame sent from a specific terminal station.

It is preliminarily decided that for example the terminal station 502A (station A) exclusively uses the second slot (slot 2) of the frame 500. In the frame sent from the station A, as shown in FIG. 20, data is put into the second slot (slot 2) disposed one slot after the frame header 501 for exclusive use for the station A and dummy data 502 for example "0" is inserted in each of all the other slots. The "dummy data 502" used herein means data having a value which has no effect on other data when ORed with the frames.

With respect to each of other stations, the station B to the station M, data is put into only the slot for exclusive use for the station in the same manner as described above.

The two following methods are used to synchronize the respective terminal stations 502A to 502M.

(1) The frame header from the toll center is received to thereby reset the intra-office frame counter.

(2) The intra-office clock is locked by the signal multi-addressed from the toll center.

All the stations are synchronized by using one of the aforementioned methods. Accordingly, frames can be sent out at every frame period after the timing for sending the frames is decided once.

Figure 21:
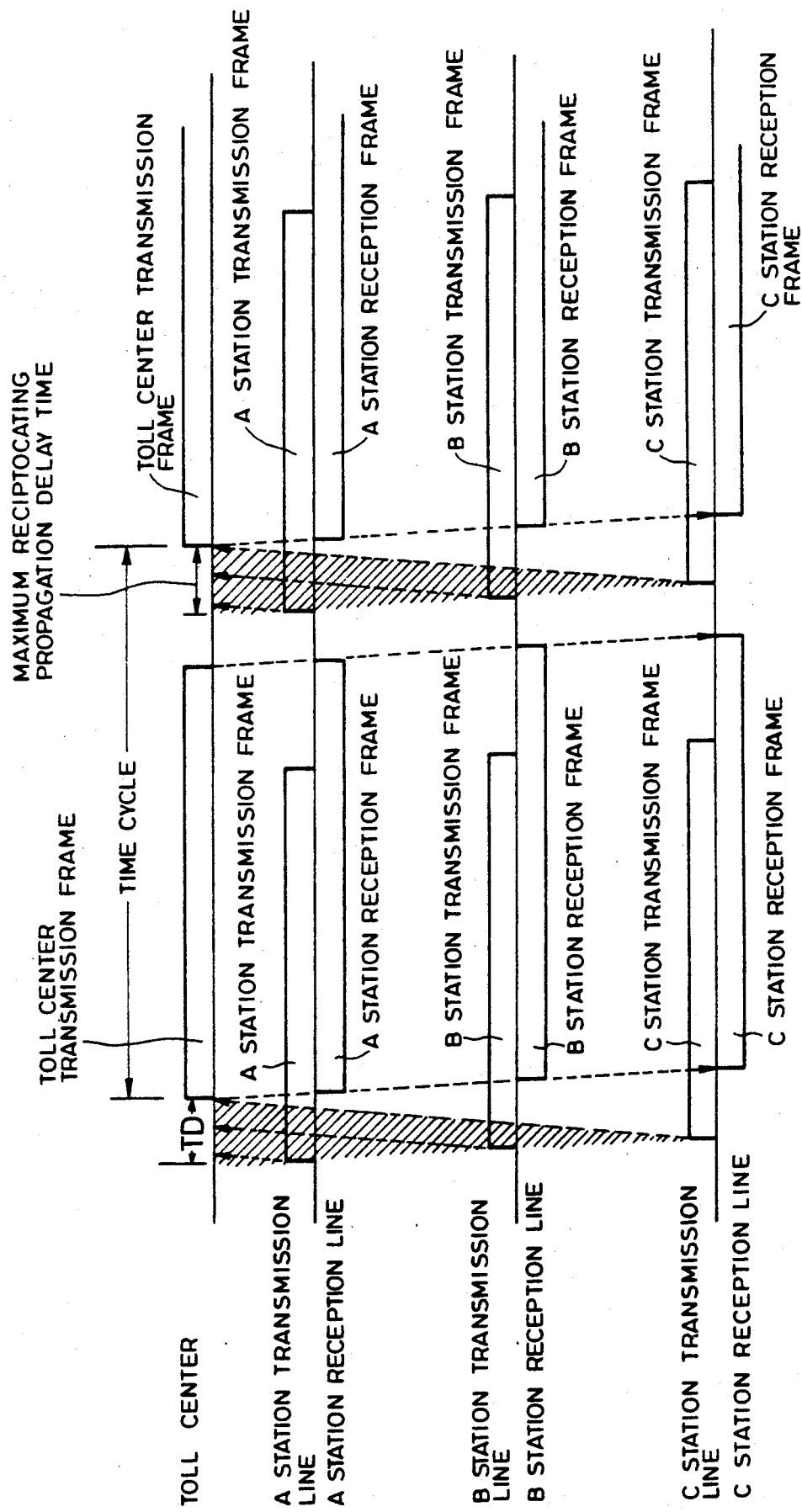
FIG. 21 is a drawing showing the transmission/reception state of the frame in the storage star network according to the present invention.

In short, as shown in FIG. 21, in the storage star network of the invention, all the frames sent from the respective terminal stations reach the toll center within a time lag less than the maximum reciprocating propagation time TD, even though differences in transmission path length of the transmission lines are considered. Each of the terminal stations is permitted to put data into only a slot allocated to the terminal station. When the signals of the respective stations are ORed in the toll center, all the slots are connected in series. Thus, the whole frame is generated and the frame header is added to the frame. The thus formed frame with the frame header is periodically simultaneously multi-addressed to all the terminal stations. Thus, synchronous communications can be attained.

It is necessary that the frame sent from each terminal station has dummy data put in at least slot/slots disposed between the frame header and the slot allocated for intra-office use. Dummy data can be automatically put in the slots after the slot allocated for intra-office use, by the OR circuit 540 and the like.

Method of Allocating Slots

Various methods of allocating slots are considered as follows:

(1) A method of stationary allocation.

This is a method explained in the aforementioned embodiment. This method is useful in the case where the transmission capacity of the respective terminal station is preliminary decided. This method is simple. Allocation is carried out when terminal stations are set up. For example, slots 1 and 2 are allocated to a certain terminal station, and slots 11 to 15 are allocated to another terminal station. As the transmission capacity of the terminal increases, slots to be allocated to a terminal station increase in number. In short, the number of the whole slots is fixed while two or more of the whole slots may be allocated for exclusive use for a terminal station in accordance with the transmission capacity.

(2) Allocation requests are made to a slot control terminal station using predetermined slots. In this case, for example, the terminal station 502M is designated to be a slot control terminal station. For example, the slot 1 and the slot 2 are used only for requesting slot allocation to the slot control terminal station. A terminal station which is to request allocation puts information, such as a destination address, a source address, the number of requesting slots, and so on, in the slot 1, and sends the frame containing the slot. If no one else has requested allocation, the information contained in the slot is transmitted to the slot control terminal station 502M. If someone else has requested allocation, collision occurs so that the information contained in the slot cannot be transmitted to the slot control terminal station 502M. The collision can be recognized by the respective terminal stations if the reception frame is monitored. In this case, the respective terminal stations are made to perform the re-transmission operation. The slot control terminal station 502M receiving the information for requesting allocation makes judgment on the basis of slot control table as to whether there is an open space sufficient for the requested slots. If there is sufficient open space, the slot control terminal station 502M sets information, such as an allocation success flag, the number of allocated slots, an ordered destination address, source address, and the like, in the slot 2 and then sends the frame containing the slot. When reception confirming information of allocated slots is sent from each of the two terminal stations expressed by the ordered destination address and the source address, the allocation is completed.

(3) One frame is separated into two regions, that is, a sync region and an async region. Allocation is requested to a slot control terminal station by using a packet in the async region.

Figure 22:
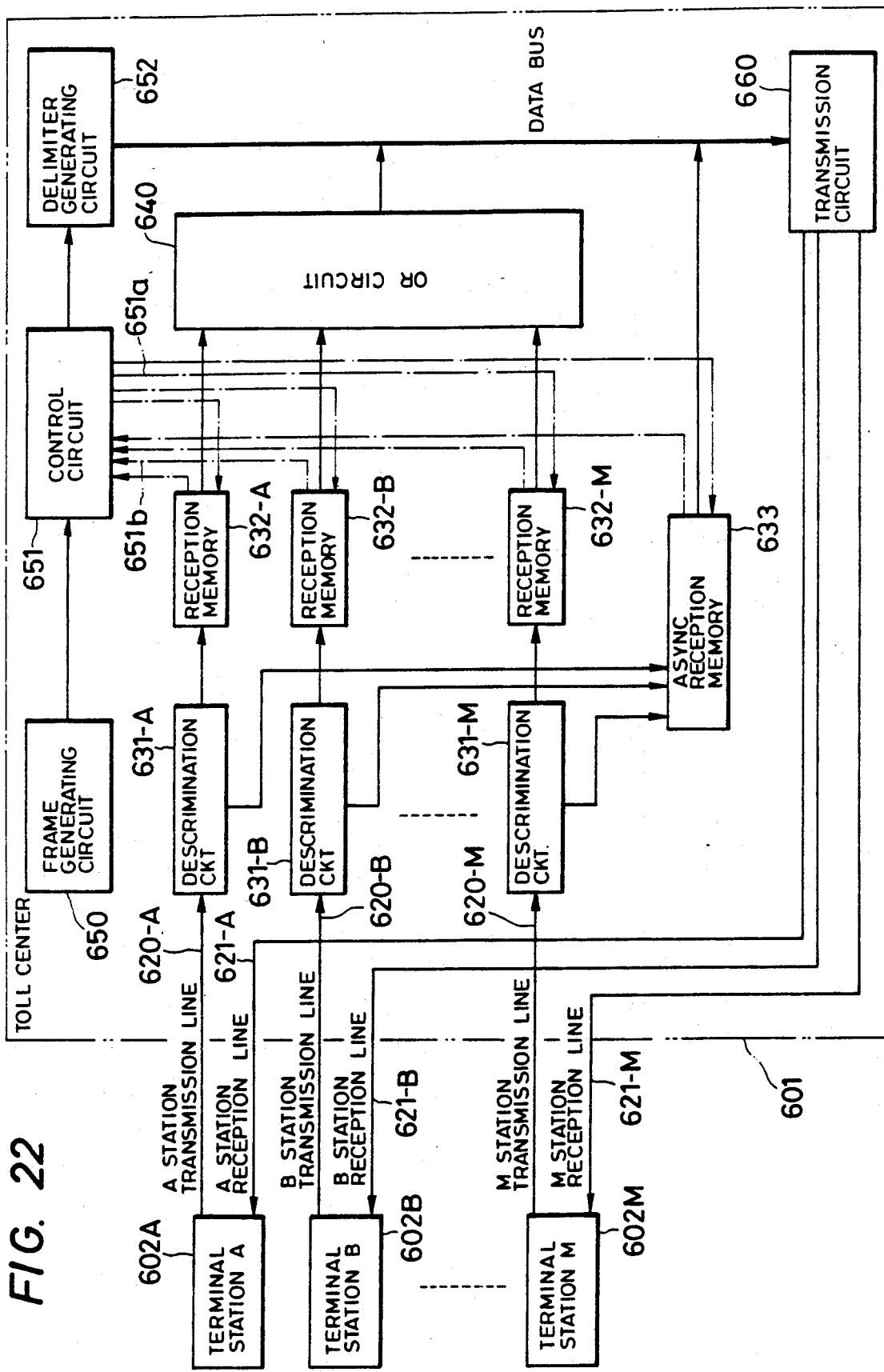
FIG. 22 is a block diagram showing a sixth embodiment of the storage star network according to the invention.

This method is carried out in such a manner as follows: For example, 80% of a frame is allocated to the sync region, and 20% of the frame is allocated to the async region. Communications as to connection control are made by using a packet in the async region. In this case, the toll center is arranged in such a manner as shown in FIG. 22 embodying a sixth embodiment of the invention.

The sixth embodiment is constructed so that frames sent from the respective terminal stations are first put into respective discrimination circuit 631-A to 631-M where data are distributed to respective reception memories 632-A to 632-M or an async reception memory 633. The discrimination circuit is arranged to judge whether the input data is a sync frame or an async packet.

If sync frames are put into the respective discrimination circuits 631A to 631M, the frames are sent to the corresponding reception memories 632A to 632M and are simultaneously multi-addressed to the terminal stations 602A to 602M through the transmission circuit 660 in the same manner as described above with respect to the embodiment of FIG. 18.

If async packets are put into the respective discrimination circuits 631A to 631M, the packets are sent to the async reception memory 633. After the sync frames are simultaneously multi-addressed, the async packets are read within vacant time corresponding to 20% of the frame, linked to the rear half of the frame, and sent out. In FIG. 22, a single async reception memory 633 is provided, so that async packets sent from all the terminal stations are collectively stored in the async reception memory 633. In this case, when packet collision occurs, the packets become invalid. To avoid such invalidation, one async reception memory 633 having capacity for storing one packet may be provided for every terminal station. Thus, all the packets can be received by the toll center 601 without collision.

In this case, however, there is a possibility that all the packets received in the async region cannot be sent out at once. Accordingly, the control circuit 651 makes a polling on the async reception memories whenever entering into the async region at the rear halves of the respective frames, so that the packets are read in the order within the range of time.

According to the storage star network of the invention as described above, data packets from terminal stations can be transmitted in the order of priority corresponding to the kind thereof or multi-level data packets can be transmitted if necessary. By limiting the maximum storage quantity of the data packets simultaneously stored on each of high-priority levels in the toll center, packet transmission warranted in maximum propagation delay and packet transmission unwarranted in maximum propagation delay can be formed on one system. Accordingly, the invention is useful especially for large-scaled systematization of various kinds of machinery, such as control tools or materials, computers, work stations, telephones and the like, in factories and offices.

Further, according to the storage star network of the invention, a hybrid switching network can be attained without the toll center making severe timing demands on the systems. Further, if the communication line of the terminal station at the time of data packet sending is in the send-enable state, the data packet sending can be immediately started without judging whether other stations are in the sending operation or not. Accordingly, the treatment of halting packet sending according to collision or the treatment or restarting packet sending (back-off algorithm and the like) is not required. Of course, it is also unnecessary for the toll center to detect a collision or send a collision signal.

On the other hand, because there is no possibility that invalid data due to collision flow is present in the circuit, the circuit can be used efficiently close to its physical capacity. Further, there is no limitation on the maximum system length for the purpose of collision detection with regard to propagation delays. Although the maximum system length entirely depends on the capacity of drivers and receivers at the opposite ends of the transmission/reception lines, through-repeaters and the like can be provided to make it possible that the terminal stations are set up in the distance over the capacity. Accordingly, there is substantially no limitation in the maximum system length.

Furthermore, according to the storage star network of the invention as described above, the network can have a guaranteed signal propagation delay time to thereby easily realize real-time transmission with importance placed on the real-time relation between transmission and reception such as conversation type voice communications. Further, the toll center is not required to detect collision or send collision signals, so that invalid signals due to collision do not flow in the circuit. Accordingly, the circuit can be used efficiently up near to its physical transmission capacity. Further, though overheads, such as destination address and the like, must be generally put in the packet information, the present invention does not require such overheads. Accordingly, in this view, efficiency can be improved.

Further, the construction that each of the terminal stations sends the whole frame having information in the intra-office used slot has the following advantage.

The toll center reads the reception signal to recognize the position of the intra-office slot used in the frame. Accordingly, the process of assembling the frame is not required. More particularly, no processing except ORing the respective frames is necessary in the toll center, so that the toll center is simple in construction. In addition, the transmission line in each of the terminal stations is originally unsuitable for sending a signal in the transmission capacity more than the whole frame. Accordingly, even though each of the terminal stations must send the whole frame including wasteful data "0", there is no influence on the efficiency of the system.

What is claimed is:

1. A storage star network comprising:
   a plurality of terminal stations for transmitting a plurality of data packets each of said data packets having a priority level relative to the other data packets;
   a toll center for receiving said plurality of data packets transmitted by said plurality of terminal stations and for transmitting said plurality of data packets to said plurality of terminal stations, said toll center including:
   a plurality of reception memories associated with each of said plurality of terminal stations effective when activated for temporarily storing said data packets transmitted by respective terminal stations, each said reception memory having an assigned level corresponding to the priority levels of a respective data packet;
   means associated with each of said terminal stations responsive to each of said plurality of data packets transmitted by said plurality of terminal stations for detecting the priority level of each respective data packet transmitted by said plurality of terminal stations; and
   means associated with each of said plurality of terminal stations responsive to said priority level detecting means for selectively activating said plurality of reception memories.

2. A storage star network according to claim 1, wherein said toll center further includes means responsive to said stored data packets in said respective reception memories for transmitting data packets stored in accordance with the priority level thereof.

3. A storage star network according to claim 2, wherein said means for transmitting data packets according to priority level includes a level enable signal sending circuit responsive to stored data in the reception memories assigned the same priority level for indicating which priority level of said reception memories are to be polled for stored data awaiting transmission.

4. A storage star network according to claim 3, wherein said means for transmitting packets according to priority level includes a signal sending controller for polling each reception memory corresponding to the level indicated by said level enable signal sending circuit and a transmitter responsive to said read signal sending controller for transmitting the data packets stored in level reception memories in which data packets are stored.

5. A storage star network according to claim 4, wherein said toll center further includes a plurality of carrier sense detector circuits each associated with a terminal station responsive to said plurality of data packets transmitted by said plurality of terminal stations for detecting a carrier signal of each of said plurality of data packets and for enabling said means for selectively activating said plurality of reception memories.

6. A storage star network according to claim 5, wherein said toll center further includes a plurality of inter-packet identifying circuits for detecting boundaries between multi channel data packets to be stored in a particular priority level reception memory and for writing an identifier into said particular priority level reception memory.

7. A storage star network according to claim 6, wherein said read signal sending controller circuit further includes a minimum interpacket time counter responsive to said interpacket identifier for disabling transmission of a data packet for a period of time equal to a minimum time interval between data packet transmission.

8. A storage star network comprising:
   a plurality of terminal stations for transmitting synchronous and asynchronous data packets;
   a toll center for receiving the data packets transmitted by said plurality of terminal stations and for transmitting synchronous and asynchronous data packets to the plurality of data terminals, including:
   a plurality of reception memories associated with each of said plurality of terminal stations for temporarily storing data packets received from said plurality of terminal stations wherein said plurality of reception memories includes a plurality of synchronous data reception memories having at least one of said synchronous data reception memories associated with each of said plurality of terminal stations for storing synchronous data packets and a plurality of asynchronous data reception memories having at least one of said asynchronous data reception memories associated with each of said plurality of terminal stations for storing asynchronous data packets;
   means associated with each of said plurality of terminal stations responsive to said data packets transmitted by said plurality of terminal stations for separating the synchronous and asynchronous data packets transmitted by said plurality of terminal stations and storing said data packets in said synchronous and asynchronous reception memories, respectively;
   means for designating a given time frame;
   means for transmitting said synchronous data packets at the start of said given time frame and indicating that all synchronous data packets available for transmission have been transmitted; and
   means for transmitting said asynchronous data packets in response to said means for indicating and said means for designating a time frame wherein said asynchronous data packets are transmitted before the beginning of the next time frame.

9. A storage star network comprising:
a plurality of terminal stations, each of said terminal stations including
   means for producing, during a frame time period, a frame of data having a frame header and a plurality of slots and for transmitting said frame in synchronization with others of said terminal stations, and
   means for transmitting a data sequence in a predetermined number of said plurality of slots and for transmitting dummy data in the other of said plurality of slots of said frame, the relationship of said predetermined number of slots and said dummy data transmitting slots for any one of said terminals being different than all others of said terminals; and
a toll center for receiving transmissions from said plurality of terminal stations and sending information for synchronization of production of said frame of data between said plurality of terminal stations including
   memory means for storing frames of data transmitted from each of said plurality of terminal stations,
   means for ORing said frames of data stored in said memory means, and
   means for producing a multi-addressing frame on the basis of a result of said ORing means and simultaneously multi-addressing said multi-addressing frame to said plurality of terminal stations with a predetermined cycle.

10. A storage start network according to claim 9, wherein said synchronizing information has two parts, said two parts include said frame header of said multi-addressing frame and a data sequence contained in said multi-addressing frame, and wherein each of said transmitting means includes means for synchronizing said frame transmission in response to at least one part of said synchronizing information.

11. A storage star network according to claim 9, wherein MRPT is a Maximum Reciprocating Propagation Time representing the units of time required for signal propagation between said toll center and the farthest one of said plurality of terminal stations, and TR is a Transmission Rate representing the number of signal bits which can be transmitted in a single unit of time, and wherein the size of said memory means of said toll center is $$MRPT \times TR.$$

12. A storage star network according to claim 9, wherein said dummy data is "0".

* * * * *